United States Patent
Grace et al.

(10) Patent No.: US 11,975,740 B2
(45) Date of Patent: May 7, 2024

(54) SYSTEM AND METHOD TO HELP ENABLE AUTONOMOUS TOWING VEHICLE

(71) Applicant: GM Cruise Holdings LLC, San Francisco, CA (US)

(72) Inventors: Nestor Grace, San Francisco, CA (US); Dogan Gidon, Berkeley, CA (US); Diego Plascencia-Vega, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 17/871,112

(22) Filed: Jul. 22, 2022

(65) Prior Publication Data

US 2024/0025451 A1    Jan. 25, 2024

(51) Int. Cl.
*B60W 60/00*     (2020.01)
*B60D 1/36*      (2006.01)
*B60W 30/18*     (2012.01)
*B60W 50/02*     (2012.01)
*B60D 1/52*      (2006.01)

(52) U.S. Cl.
CPC .. *B60W 60/0025* (2020.02); *B60W 30/18009* (2013.01); *B60W 50/0205* (2013.01); *B60W 50/0225* (2013.01); *B60D 1/36* (2013.01); *B60D 1/52* (2013.01); *B60W 2530/20* (2013.01); *B60W 2530/203* (2020.02); *B60W 2556/65* (2020.02)

(58) Field of Classification Search
CPC ....... B60W 60/0025; B60W 30/18009; B60W 50/0205; B60W 50/0225; B60W 2530/203; B60W 2556/65; B60W 2530/20; B60D 1/36; B60D 1/52
See application file for complete search history.

(56) References Cited

U.S. PATENT DOCUMENTS

| | | | |
|---|---|---|---|
| 11,274,929 B1 * | 3/2022 | Afrouzi ............... | G05D 1/0219 |
| 11,280,284 B1 * | 3/2022 | Chise .................. | H04W 12/009 |
| 11,644,830 B1 * | 5/2023 | Gate .................. | B60W 60/0025 |
| | | | 701/2 |
| 2015/0239436 A1 * | 8/2015 | Kanai ................. | B60T 7/08 |
| | | | 901/1 |
| 2017/0072967 A1 * | 3/2017 | Fendt ................ | B60W 50/0205 |
| 2017/0344023 A1 * | 11/2017 | Laubinger ............ | G08G 1/22 |
| 2019/0049991 A1 * | 2/2019 | Laur ................... | B60W 30/165 |
| 2021/0109535 A1 * | 4/2021 | Tansey ................ | B60W 30/09 |
| 2021/0181737 A1 * | 6/2021 | Patnaik ............... | G05D 1/0055 |
| 2021/0181760 A1 * | 6/2021 | Lee .................... | G05D 1/0287 |
| 2021/0197702 A1 * | 7/2021 | Krishnamurthi ...... | G05D 1/0295 |
| 2021/0264794 A1 * | 8/2021 | Merwaday ............ | B60W 30/16 |
| 2022/0207450 A1 * | 6/2022 | Francis ................ | G06Q 50/30 |
| 2022/0308577 A1 * | 9/2022 | Pasch .................. | G05D 1/0223 |

* cited by examiner

*Primary Examiner* — Jaime Figueroa
*Assistant Examiner* — Joshua Alexander Garza

(57) ABSTRACT

Particular embodiments described herein provide for a system and method to help enable a towing vehicle. In an example, the system can identify a location of the disabled vehicle, deploy the towing vehicle to the location of the disabled vehicle, where the towing vehicle uses sensor data from a sensor suite and a perception module to navigate to the location of the disabled vehicle, and use the towing vehicle to tow the disabled vehicle to a new location.

20 Claims, 20 Drawing Sheets ded or override compute, sensing, communication, etc.) and move the disabled AV to the second location. In some cases, the towing AV can be equipped to physically tow the disabled AV.

SYSTEM AND METHOD TO HELP ENABLE AUTONOMOUS TOWING VEHICLE

TECHNICAL FIELD OF THE DISCLOSURE

The present disclosure relates generally to a vehicle and, more specifically, to a system and method to help enable an autonomous towing vehicle.

BACKGROUND

An autonomous vehicle (AV) is a vehicle that is capable of sensing and navigating its environment with little or no user input. The AV may sense its environment using sensing devices such as radio detection and ranging (RADAR), light detection and ranging (LIDAR), image sensors, cameras, and the like. An AV system may also use information from a global positioning system (GPS), navigation systems, vehicle-to-vehicle communication, vehicle-to-infrastructure technology, and/or drive-by-wire systems to navigate the vehicle. As used herein, the phrase "autonomous vehicle" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying FIGURES, wherein like reference numerals represent like parts, in which.

Figure 1:
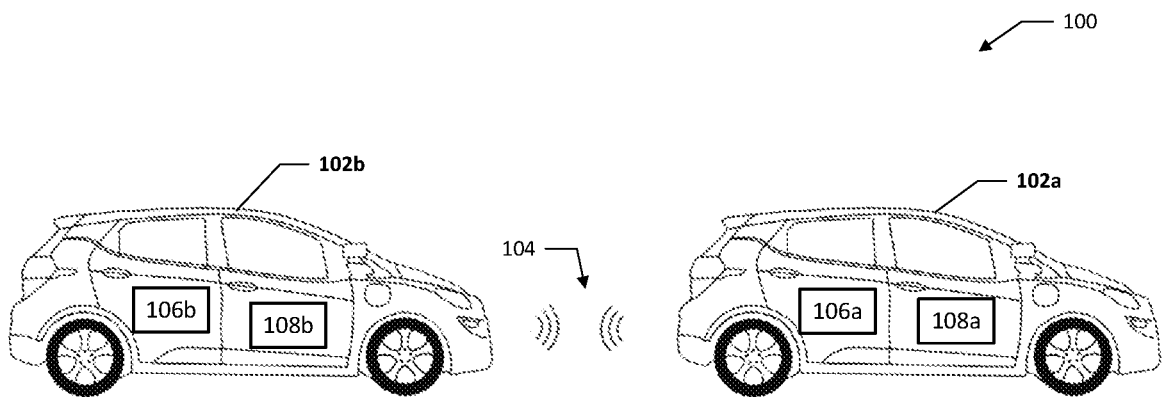
FIG. 1 shows an autonomous vehicle environment according to some embodiments of the present disclosure.

The FIGURES of the drawings are not necessarily drawn to scale, as their dimensions can be varied considerably without departing from the scope of the present disclosure.

DESCRIPTION OF EXAMPLE EMBODIMENTS OF THE DISCLOSURE

Overview

The demand for autonomous vehicle (AV) ride hail and rideshare has been rising. However, many services cannot meet the rising demand due to high cost and technical challenges. For example, an AV can be relatively expensive and requires a complex system of sensors to allow the AV to safely navigate in the environment. Sometimes a sensor or other component of the AV can become disabled or inoperable and render the AV disabled. The disabled AV can create an unsafe environment, especially if the AV is disabled on a road and is blocking traffic.

For example, there may be times when an AV breaks and stops operating and becomes a disabled AV. At times the disabled AV may even be stuck on a street or road and is blocking traffic as the disabled AV may not be able to pull over to a safe non-intrusive location. The disabled AV may not be able to pull over to the safe non-intrusive location because of any number of reasons from a broken/dead main computer, to broken sensors, to a broken communications module which does not allow the disabled AV to obtain remote assistance, to a compute issue. Note that the term "compute" includes both software (e.g., programing, etc.) and hardware (e.g., processor, etc.). Having a disabled AV disturb traffic has many adverse consequences and could even cause other road users to perform unsafe maneuvers to overtake the disabled AV and/or navigate around the disabled AV. Therefore, improved technology for autonomous vehicles is needed.

A system and method to help enable an autonomous towing vehicle can help to overcome some of these problems. More specifically, in an illustrative example, after an AV gets becomes disabled, a fleet management system 1402 (illustrated in FIG. 14) would be aware that the AV is disabled either because the fleet management system 1402 has received some sort of communication from the disabled AV indicating that the AV is disabled, or the fleet management system 1402 could infer that the disabled AV is disabled after not receiving a status communication from the disabled AV for some time. In order to help resolve the situation, the fleet management system 1402 could send a nearby fully functioning AV, referred herein as a towing AV, to try and help get the disabled AV to a safe pullover location. In some examples, the towing AV may be a unique AV equipped with additional sensors (including but not limited to additional LiDAR, RADAR, IR and visual range cameras, IMUs, etc.) or additional hardware such as additional compute or memory units in order to facilitate functions of the towing AV and to help the disabled AV. As used herein, the term "towing" includes virtual towing. The term "virtual towing" includes moving the disabled AV from a first location to a different second location without establishing a physical connection with the disabled AV. For example, the towing AV can take control of a portion of the system of the disabled AV (e.g., route planning, supplementing one or more sensors on the disabled AV, etc.) or can take full control of the entire system of the disabled AV and move the disabled AV (e.g., from a road to a parking lot, repair facility, or other location) without establishing a physical connection with the disabled AV.

Once the towing AV arrives at the location of the disabled AV, the disabled AV and towing AV open a communication channel between the towing AV and the disabled AV via vehicle-to-vehicle communication or other communication protocol. The communication channel between the towing AV and the disabled AV could include wireless communications, Bluetooth™, radio, short range IR, cell communication as well as other communications protocols. The direct communication would allow the towing AV to obtain diagnostic information, which may not be available to the fleet management system 1402, and better understand why the disabled AV is unable to resume operations.

The local communication can allow the towing AV, which is still in communication with the fleet management system 1402, to transmit additional information about the disabled AV and allow for the fleet management system 1402 to develop a plan for how to recover the disabled AV. In some examples, if the disabled AV can communicate with the fleet management system 1402 or other intermediary, the towing AV and the disabled AV may communicate through the fleet management system 1402 or other intermediary. In some examples, the communication channel to the fleet management system 1402 can be used directly to recover the disabled AV. More specifically, the disabled AV could have issues communicating with remote assistance and is stuck somewhere on the road. In this case, the towing AV could help route a remote assistance connection to the disabled AV using the towing AV's functioning communications to the fleet management system 1402 and the vehicle-to-vehicle communication between the towing AV and the disabled AV to allow the disabled AV to navigate to a secure pullover location The particular actions taken by the towing AV to help resolve the issues with the disabled AV and tow the disabled AV to a safe location will depend on the nature of the failure mode for the disabled AV. For example, the disabled AV may be stuck because the perception sensors of the disabled AV are not working properly. In this case, the disabled AV is effectively blind as it does not have access to perception information and would not be able to run the planning and controls operations needed for the disabled AV to navigate. The towing AV can make use of its own perception and planning capabilities to coordinate a towing operation. In this example, the towing AV could communicate controls signals to the disabled AV for the disabled AV to travel to an appropriate location or to navigate the disabled AV to a parking lot for maintenance. This form of assistance could also be useful when the disabled AV is stuck because its main compute is broken. In this case, if the disabled AV still has functioning perception sensors, the disabled AV could stream sensor data to the towing AV. The towing AV could use the sensor data from the disabled AV along with its own perception information to run perception and planning functions for both the towing AV and the disabled AV and perform a towing operation. In addition, the towing AV could modify its own internal planning and controls capabilities to include information regarding the disabled AV. For example, the towing AV could plan trajectories considering that the towing AV has another vehicle in tow and could calculate two different throttle commands, two different break commands, and two different steering commands. More specifically, the towing AV can determine throttle, brake, and steering commands for the towing AV and a different second set of throttle, brake, and steering commands for the disabled AV being towed by the towing AV. The towing AV can further account for the communication delay between itself and the disabled AV. Moreover, the towing capabilities can be readily generalized to multiple malfunctioning vehicles.

It is important to note that there are some cases where the disabled AV may be disabled or stuck for reasons that the towing AV is not able to resolve or move the disabled AV. In these cases, the towing AV could serve more of a sentinel role. For example, a flat tire, or something that is physically obstructing the disabled AV's motion (e.g., a large object getting stuck under the disabled AV) may not be easily addressed autonomously by the towing AV. In some examples, the towing AV can be equipped with robotic appendages to address a flat tire or physical obstruction. In cases where the towing AV is unable to directly assist or recover the disabled AV, the towing AV may still function to retrieve diagnostics about the problem with the disabled AV and relay that information to the fleet management system 1402. The diagnostics about the problem with the disabled AV can be used by the fleet management system 1402 to determine the next course of action to deal with the disabled AV.

There are multiple ways the towing AV can enable recovery of the disabled AV. In some examples, the disabled AV may be simply towed to a safe waiting area (e.g., a pullover location on the side of the road). After the disabled AV has been towed to a safe waiting area, the fleet management system 1402 could decide to dispatch a human operator at the location of the disabled AV and move the disabled AV using a joystick or a fly by wire type of device. In other examples, the disabled AV can remain in the waiting area until traffic levels have lowered (e.g., during a time when traffic levels are low such as at night) and then the disabled AV could navigate by itself (if the remaining capabilities of the disabled AV allow the disabled AV to navigate) to a repair location at a lowered velocity. In yet other examples, the disabled AV may be towed by the towing AV to a repair location immediately or during low traffic hours. In yet other examples, an AV physical towing vehicle, an AV with a physical towing trailer, or a human operated physical towing truck may be dispatched to retrieve the disabled AV.

Using a towing AV for automated towing operations, can be significantly cheaper compared to dispatching physical tow trucks and could improve the ease of operations by reducing interruptions due to AVs getting stuck. The current alternative to this solution would be that the stuck/disabled AV would sit, possibly obstructing traffic, until a human operator could arrive at the scene to retrieve it. This could cause more disruption to traffic and require many more resources from fleet operations in order to have available staff to respond to multiple failures happening in an operational area. By using a towing AV to help a disabled AV, can help the disabled AV recover faster as compared to waiting for a human to be dispatched to help the disabled AV.

Embodiments of the present disclosure provide a method for assisting a disabled vehicle using a towing vehicle. The method including identifying a location of the disabled vehicle, deploying the towing vehicle to the location of the disabled vehicle, the towing vehicle uses sensor data from a sensor suite and a perception module to navigate to the location of the disabled vehicle and using the towing vehicle to tow the disabled vehicle to a new location. In some examples, a two-way communication channel is established between the disabled vehicle and the towing vehicle.

The disabled vehicle can be disabled due to a compute issue and one or more modules are reset to try and resolve the compute issue. The compute issue can be related to a communication module and the compute issue may prevent or restrict the disabled vehicle from communicating with a fleet management system. In such an example, the communication module on the towing vehicle is used as a bridge between the disabled vehicle and the fleet management system to allow the disabled vehicle to communicate with the fleet management system. In some examples, the compute issue is related to collecting and/or processing of sensor data and the towing vehicle shares sensor data with the disabled vehicle. In other examples, the disabled vehicle is disabled due to a mechanical issue. The mechanical issue can be a flat tire and the towing vehicle temporarily fixes the flat tire to allow the disabled vehicle to be towed to the new location.

In an example, the towing vehicle takes control of the disabled vehicle to tow the disabled vehicle to the new location. In another example, the towing vehicle provides a guidance signal for the disabled vehicle to follow to tow the disabled vehicle to the new location. The guidance signal is a laser, beam of light, or beacon. In some examples, the beacon can be a visual beacon (e.g., a QR code) that identifies the towing vehicle. In other examples, the beacon can be a virtual beacon where, if the towing vehicle is in communication with the disabled vehicle, the towing vehicle communicates location information of the towing vehicle to the disabled vehicle and the disabled vehicle can use the location information of the towing vehicle to identify the towing vehicle from other objects in the environment of the disabled vehicle. In some examples, the towing vehicle physically tows the disabled vehicle to the new location. The disabled vehicle may be stopped on a street or road and is blocking traffic and the disabled vehicle is towed to the new location where the disabled vehicle is no longer blocking traffic on the street or road. The disabled vehicle can be an autonomous vehicle. The disabled vehicle and the towing vehicle can be part of a fleet of autonomous vehicles controlled by the fleet management system.

In an example, the towing vehicle can include a communication module, a navigation module to control a motion of the towing vehicle and cause the towing vehicle to travel to a location of a disabled vehicle, and a disabled vehicle diagnostic module, to perform diagnostic testing on the disabled vehicle. In some examples, the towing vehicle navigates to a last known location of the disabled vehicle. The towing vehicle can use the communication module to establish a two-way communication channel with the disabled vehicle and perform the diagnostic testing on the disabled vehicle. The towing vehicle can also include a disabled vehicle repair module, wherein based on results of the diagnostic testing, the disabled vehicle repair module repairs the disabled vehicle to allow the towing vehicle to tow the disabled vehicle. Also, the towing vehicle can include a physical towing mechanism to physically attach to the disabled vehicle and tow the disabled vehicle.

As will be appreciated by one skilled in the art, aspects of the present disclosure, in particular aspects of the system and method to help enable an autonomous towing vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as an "engine," a "circuit," a "module," or a "system." Functions described in this disclosure may be implemented as an algorithm executed by one or more hardware processing units (e.g., one or more microprocessors) of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied (e.g., stored) thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings. Other features and advantages of the disclosure will be apparent from the following description and the claims.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y. The terms "substantially," "close," "approximately," "near," and "about," generally refer to being within +/−20% of a target value (e.g., about 10 meters includes between 8 meters and 12 meters and/or within +/−5 or 10% of a target value) based on the context of a particular value as described herein or as known in the art. In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings. As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

It is to be understood that other embodiments may be utilized and structural changes may be made without departing from the scope of the present disclosure. Substantial flexibility is provided by an electronic device in that any suitable arrangements and configurations may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

Example Autonomous Vehicle System

FIG. 1 shows a portion of an AV environment 1400 according to some embodiments of the present disclosure.

The AV environment 1400 is described in more detail in FIG. 14 below. The AV environment 1400 can include a towing AV 102a and a disabled AV 102b.

The towing AV 102a can include an onboard controller 106a and a sensor suite 108a. The onboard controller 106a controls the towing AV 102a, and in some examples, the disabled AV 104b, and helps facilitate communication with the towing AV 102a. The onboard controller 106a is described in more detail in FIG. 3 and below. The sensor suite 108a detects the environment inside and outside of the towing AV 102a and in some examples, the disabled AV 104b, and generates sensor data describing the environment surrounding the towing AV 102a and in some examples, the disabled AV 104b. The disabled AV 102b can include an onboard controller 106b and a sensor suite 108b. The onboard controller 106b controls the disabled AV 102b and helps facilitate communication with the disabled AV 102b. The onboard controller 106b is described in more detail in FIG. 3 and below. The sensor suite 108b detects the environment inside and outside of the disabled AV 102b and generates sensor data describing the environment surrounding the disabled AV 102b.

The disabled AV 102b can be disabled or inoperable. For example, the disabled AV 102b can have a compute issue and/or a mechanical issue that prevents the disabled AV 102b from functioning properly. More specifically, the disabled AV 102b may have an issue with the onboard controller 106b and/or an issue with one or more sensors in the sensor suite 108b.

Figure 2A:
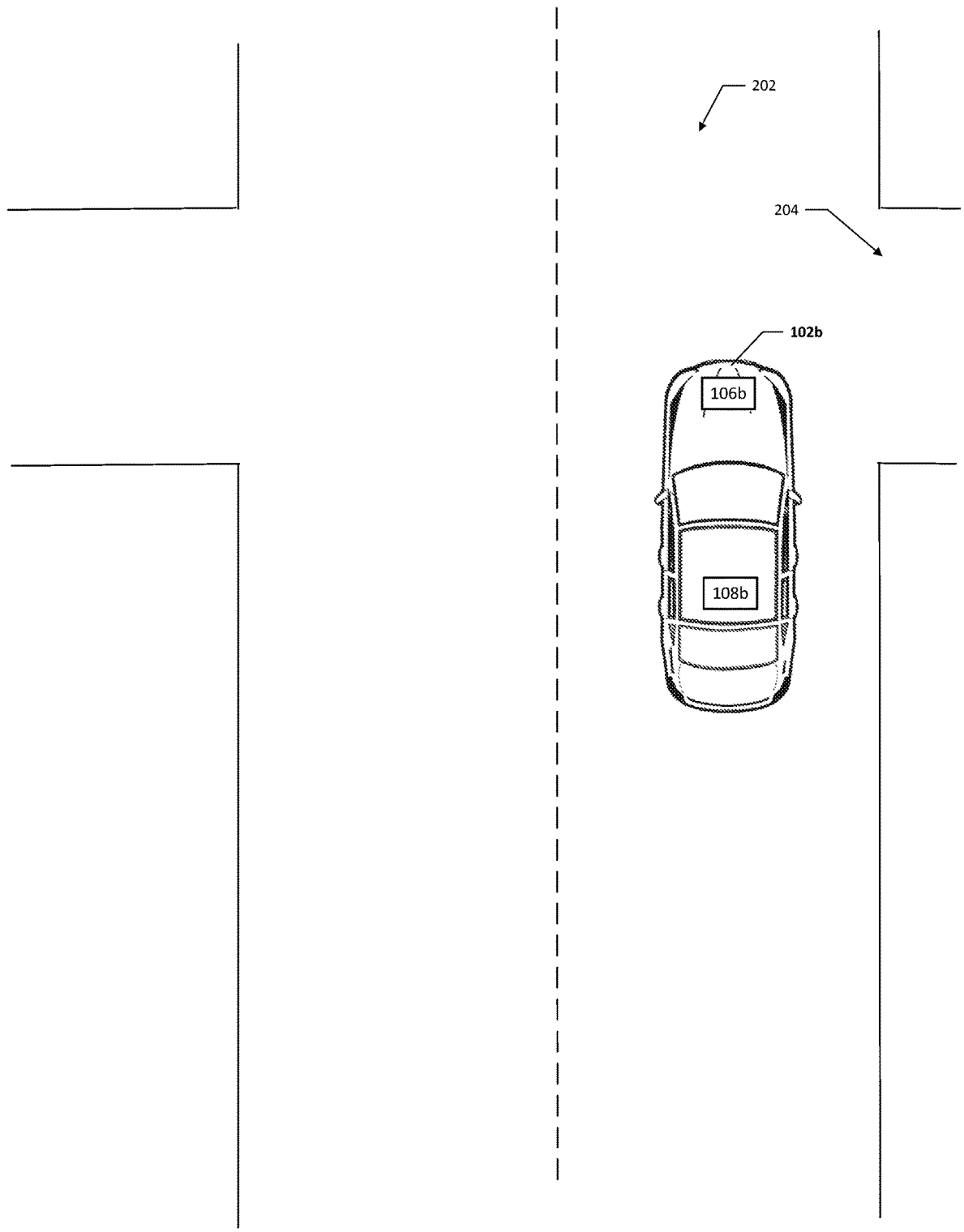
FIGS. 2A-2C illustrate an example system summary according to some embodiments of the present disclosure.
Figure 2B:
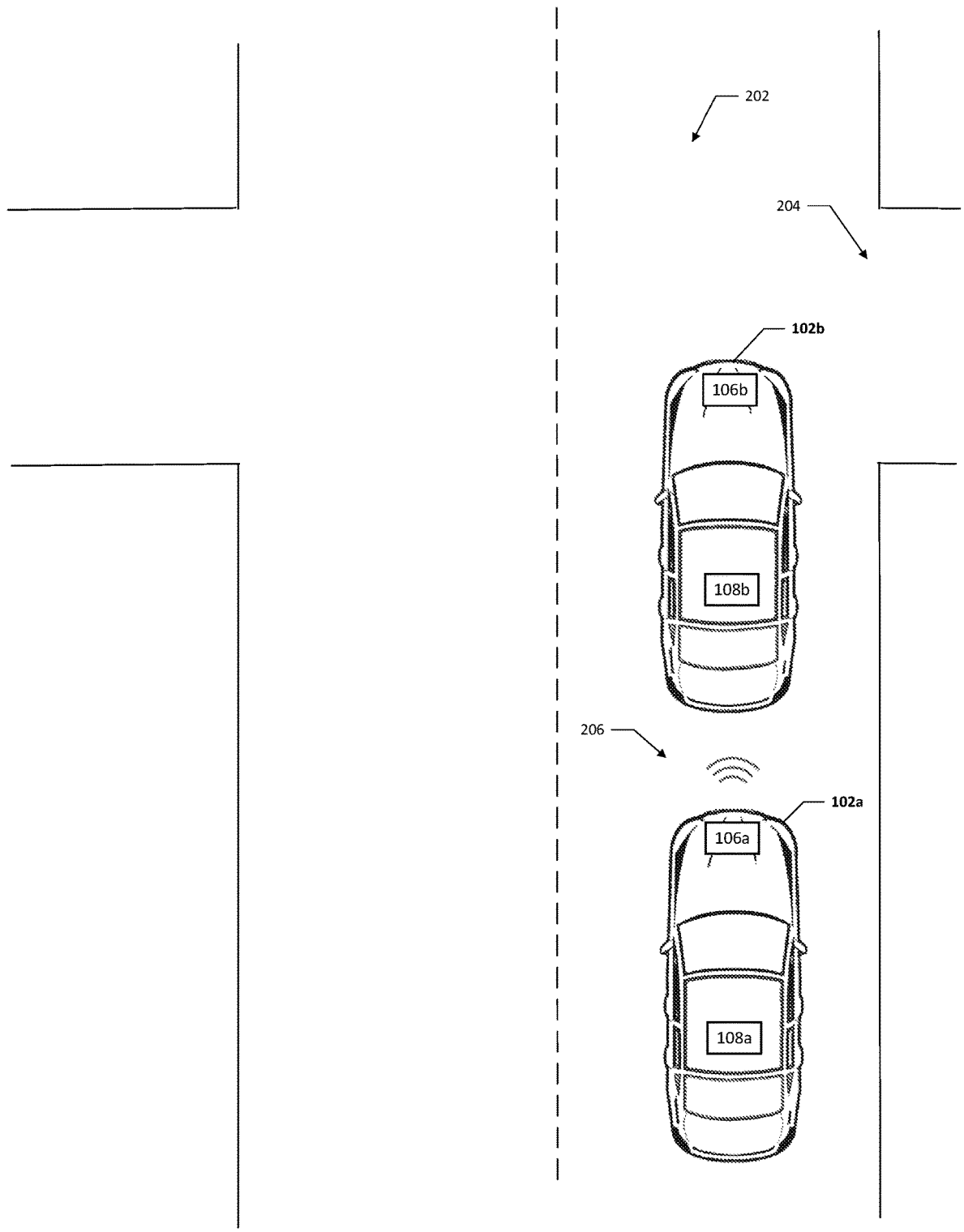
Figure 2C:
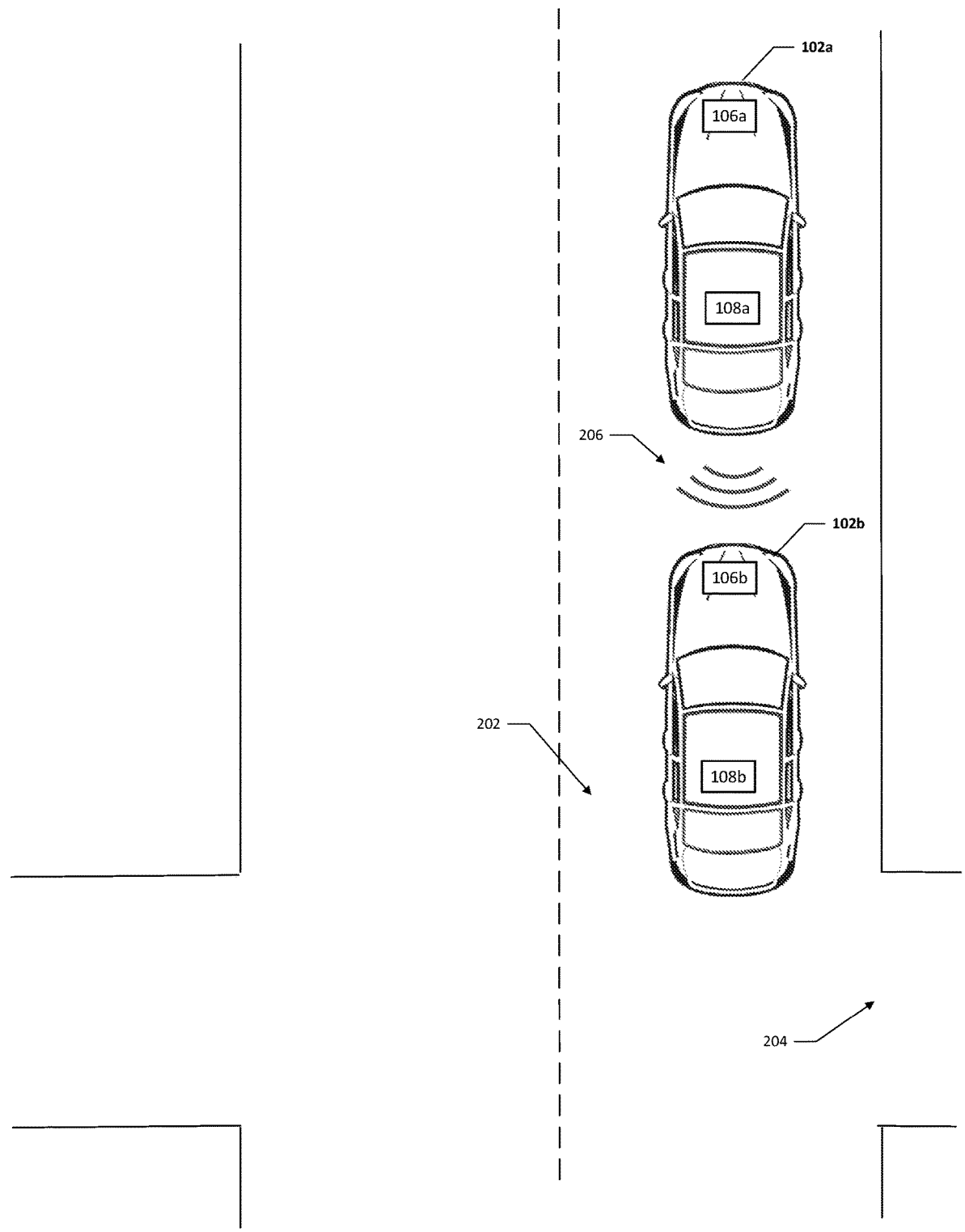

Once the towing AV 102a arrives at the location of the disabled AV 102b, the towing AV 102a and the disabled AV 102b could then open a communication channel 104 between the towing AV 102a and the disabled AV 102b. The communication channel 104 between the towing AV 102a and the disabled AV 102b could include wireless communications, Bluetooth™, radio, short range IR, cell communication as well as other communications protocols. In some examples, if the communication modules on the disabled AV 102b are functioning, the communication channel 104 is a bi-directional communication channel. The communication channel 104 can be used by the towing AV 102a to obtain diagnostic information about the disabled AV 102b and better understand why the disabled AV 102b is unable to resume operations. In some examples, if the communication modules on the disabled AV 102b are not functioning, the communication channel 104 is a one direction communication channel (as illustrated in FIGS. 2A-2C) from the towing AV 102a to the disabled AV 102b. In yet other examples, the long range communication modules (e.g., WiFi, cellular, etc.) on the disabled AV 102b but the short range communication modules (e.g. Bluetooth™, NFC, etc.) are still functioning. Because the long range communication modules on the disabled AV 102b are not functioning, the fleet management system 1402 could infer that the disabled AV 102b is disabled after not receiving a status communication from the disabled AV for some time. The towing AV 102a can establish short range communication with the disabled AV 102b using the communication channel 104 and act as a bridge between the disabled AV 102b and the fleet management system 1402. If the fleet management system 1402 is unable to repair the disabled AV 102b, the towing AV 102a can take over and tow the disabled AV 102b to a service center or, if the disabled AV 102b has limited mobility, the towing AV 102a can to the disabled AV 102b to a relatively safe location.

As illustrated in FIG. 1, the towing AV 102a is virtually towing the disabled AV 102b. The particular actions taken by the towing AV 102a to help resolve the issues with the disabled AV 102b and tow the disabled AV 102b to a safe location will depend on the nature of the failure mode for the disabled AV 102b. The safe location can be a parking lot, the side of the road, a repair facility, or some other location that is relatively safer than the current location of the disabled AV 102b. In an example, the disabled AV 102b may be stuck in the middle of a road because the perception sensors of the disabled AV 102b are not working properly. In this case, the disabled AV 102b is effectively blind as it does not have access to perception information and would not be able to run the planning and controls operations (e.g., the disabled AV 102b is not able to create acceleration commands, breaking commands, steering commands, etc.) needed for the disabled AV 102b to navigate. In this example, the towing AV 102a can make use of its own perception and planning capabilities to coordinate a towing operation. More specifically, the towing AV 102a could communicate controls signals (e.g., acceleration commands, breaking commands, steering commands, etc.) to the disabled AV 102b using the communication channel 104 to tow the disabled AV 102b to an appropriate location or to navigate the disabled AV 102b to a parking lot for maintenance.

In another example, the disabled AV 102b is stuck because its main compute is broken. In this case, if the disabled AV 102b still has functioning perception sensors, the disabled AV 102b could stream sensor data to the towing AV 102a using the communication channel 104. The towing AV 102a could use the sensor data from the disabled AV 102b along with its own perception information to run perception and planning functions for both the towing AV 102a and the disabled AV 102b. In some examples, the towing AV 102a uses the sensor data of the towing AV 102a to determine route and trajectory planning for the disabled AV 102b. The towing AV 102a can communicate the determined route and trajectory planning for the disabled AV 102b to the disabled AV 102b and the disabled AV 102b can use the route and trajectory planning to determine the acceleration commands, breaking commands, steering commands, etc. In addition, the towing AV 102a could modify its own internal planning and controls capabilities to include information regarding the disabled AV 102b. For example, the towing AV 102a could plan trajectories considering that the towing AV 102a has another vehicle in tow. The towing AV 102a can further account for the communication delay between itself and the disabled AV 102b.

Note that reference to "an AV 102" or "the AV 102" is referring to both the towing AV 102a and the disabled AV 102b if the disabled AV 102b was not disabled. If the disabled AV 102b was not disabled, the disabled AV 102b could have all the functions of the towing AV 102a. The AV 102 is a vehicle that is capable of sensing and navigating its environment with little or no user input. The AV 102 may be a semi-autonomous or fully autonomous vehicle (e.g., a boat, an unmanned aerial vehicle, a driverless car, etc.). Additionally, or alternatively, the AV 102 may be a vehicle that switches between a semi-autonomous state and a fully autonomous state and thus, the AV may have attributes of both a semi-autonomous vehicle and a fully autonomous vehicle depending on the state of the vehicle. The AV 102 may include a throttle interface that controls an engine throttle, motor speed (e.g., rotational speed of electric motor), or any other movement-enabling mechanism, a brake interface that controls brakes of the AV (or any other movement-retarding mechanism), and a steering interface that controls steering of the AV (e.g., by changing the angle of wheels of the AV). The AV 102 may additionally or alternatively include interfaces for control of other vehicle functions (e.g., windshield wipers, headlights, turn indicators, air conditioning, etc.).

The onboard controller 106 controls operations and functionality of the AV 102. In some embodiments, the onboard controller 106 is a general-purpose computer, but may additionally or alternatively be any suitable computing device. The onboard controller 106 is adapted for input/output (I/O) communication with other components of the AV 102 (e.g., the sensor suite 108, an UI module of the AV, etc.) and external systems (e.g., the fleet management system 1402 illustrated in FIG. 14). The onboard controller 106 may be connected to the Internet via a wireless connection (e.g., via a cellular data connection). Additionally, or alternatively, the onboard controller 106 may be coupled to any number of wireless or wired communication systems.

The onboard controller 106 processes sensor data generated by the sensor suite 108 and/or other data (e.g., data received from the fleet management system 1402, etc.) to determine the state of the AV 102. Based upon the vehicle state and programmed instructions, the onboard controller 106 modifies or controls behavior of the AV 102. In some embodiments, the onboard controller 106 implements an autonomous driving system (ADS) for controlling the AV 102 and processing sensor data from the sensor suite 108 and/or other sensors in order to determine the state of the AV 102. Based upon the vehicle state and programmed instructions, the onboard controller 106 modifies or controls driving behavior of the AV 102.

The sensor suite 108 can include a computer vision ("CV") system, localization sensors, and driving sensors. For example, the sensor suite 108 may include interior and exterior cameras, radar sensors, sonar sensors, light detection and ranging (LIDAR) sensors, thermal sensors, wheel speed sensors, inertial measurement units (IMUS), accelerometers, microphones, strain gauges, pressure monitors, barometers, thermometers, altimeters, ambient light sensors, etc. The sensors may be located in various positions in and around the AV 102. For example, the AV 102 may have multiple cameras located at different positions around the exterior and/or interior of the AV 102.

The AV 102 may also include a rechargeable battery that powers the AV 102. The battery may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the AV 102 is a hybrid electric vehicle that also includes an internal combustion engine for powering the AV 102 (e.g., when the battery has low charge). In some embodiments, the AV 102 includes multiple batteries. For example, the AV 102 can include a first battery used to power vehicle propulsion, and a second battery used to power the onboard controller 106 and/or AV hardware (e.g., the sensor suite 108 and the Onboard controller 106). The AV 102 may further include components for charging the battery (e.g., a charge port configured to make an electrical connection between the battery and a charging station).

Example System Summary

FIG. 2A illustrates the disabled AV 102b stopped on a roadway 202. In an example, the disabled AV 102b may be stopped or blocking an intersection 204 in the roadway 202. The disabled AV 102b can create an unsafe environment the roadway 202, especially for other users of the roadway 202 as they navigate around the disabled AV 102b.

After the disabled AV 102*b* becomes disabled, the fleet management system 1402 may receive some sort of communication from the disabled AV 102*b* indicating that the AV is disabled. In another example, the fleet management system 1402 could infer that the disabled AV 102*b* is disabled after not receiving a status communication from the disabled AV 102*b* for some time. In yet another example, a third party may alert the fleet management system 1402 that the disabled AV 102*b* is disabled and is blocking the intersection 204 and the roadway 202. In order to help resolve the situation, the fleet management system 1402 could send a nearby towing AV 102*a*, to try and help get the disabled AV to a safe pullover location.

FIG. 2B illustrates the towing AV 102*a* arriving at the destination of the disabled AV 102*b* stopped on the roadway 202. The towing AV 102*a* can attempt to establish a communication with the disabled AV 102*b* to perform diagnostics on the disabled AV 102*b* to try and determine why the disabled AV 102*b* has become disabled. In an example, the towing AV 102*a* may also use one or more sensor from the towing AV's sensor suite 108*a* to try and determine why the disabled AV 102*b* has become disabled. For example, the towing AV 102*a* may use a camera from the sensor suite 108*a* to try and identify any visual clues or reasons why the disabled AV 102*b* is disabled. As illustrated in FIG. 2B, the towing AV 102*a* is only able to establish a one-way communication channel 206 with the disabled AV 102*b*. In some examples, the one-way communication channel 206 may be used by the towing AV 102*a* to take over complete control of the disabled AV 102*b*. This form of assistance can be when the disabled AV 102*b* is disabled because of a compute issue and the disabled AV 102*b* is unable to move due to the compute issue.

FIG. 2C illustrates the towing AV 102*a* using the one-way communication channel 206 to take over complete control of the disabled AV 102*b* and tow the disabled AV 102*b* away from the intersection 204. In an example, the towing AV 102*a* can tow the disabled AV 102*b* off of the roadway 202 to a parking lot, a maintenance facility, or some other safe location away from the unsafe environment on the roadway 202. Using the one-way communication channel 206, the towing AV can make use of its own perception and planning capabilities to coordinate a towing operation. In this example, the towing AV 102*a* can communicate controls signals to the disabled AV 102*b* that allow the towing AV 102*a* to tow the disabled AV 102*b* to a safe location. The towing AV 102*a* can modify its own internal planning and controls capabilities to include information regarding the disabled AV 102*b*. For example, the towing AV could plan trajectories considering that the towing AV has another vehicle in tow and would calculate two throttle, brake, and steering commands, one for the towing AV 102*a* and one for the disabled AV 102*b*. In addition, the towing AV 102*a* can further account for the communication delay between itself and the disabled AV 102*b*. In some examples, if the disabled AV 102*b* is able to create throttle, brake, and steering commands for the disabled AV 102*b*, the towing AV 102*a* can send planning and trajectory data for the disabled AV 102*b* to the disabled AV 102*b*. The disabled AV 102*b* can use the planning and trajectory data from the towing AV 102*a* to create the throttle, brake, and steering commands for the disabled AV 102*b*.

In an example, if the towing AV 102*a* was able to establish a two-way communication with the disabled AV 102*b* (e.g., communication channel 104 illustrated in FIG. 1) and if the disabled AV 102*b* still has a functioning sensor suite 108*b*, the disabled AV 102*b* could communicate sensor data to the towing AV 102*a*. The towing AV 102*a* could use the sensor data from the sensor suite 108*b* of the disabled AV 102*b* along with its own perception information to run perception and planning functions for both the towing AV 102*a* and the disabled AV 102*b* during the towing. In another example, if the towing AV 102*a* was able to establish a two-way communication with the disabled AV 102*b* and the disabled AV 102*b* did not have one or more functioning sensors in the sensor suite 108*b* but the main compute system is functioning, then the towing AV 102*a* may use the sensor data from the sensor suite 108*a* of the towing AV 102*a* to supplement the missing sensor data from the sensor suite 108*b* of the disabled AV 102*b* to allow the disabled AV 102*b* to travel to a safe location.

Example Onboard Controller

Figure 3:
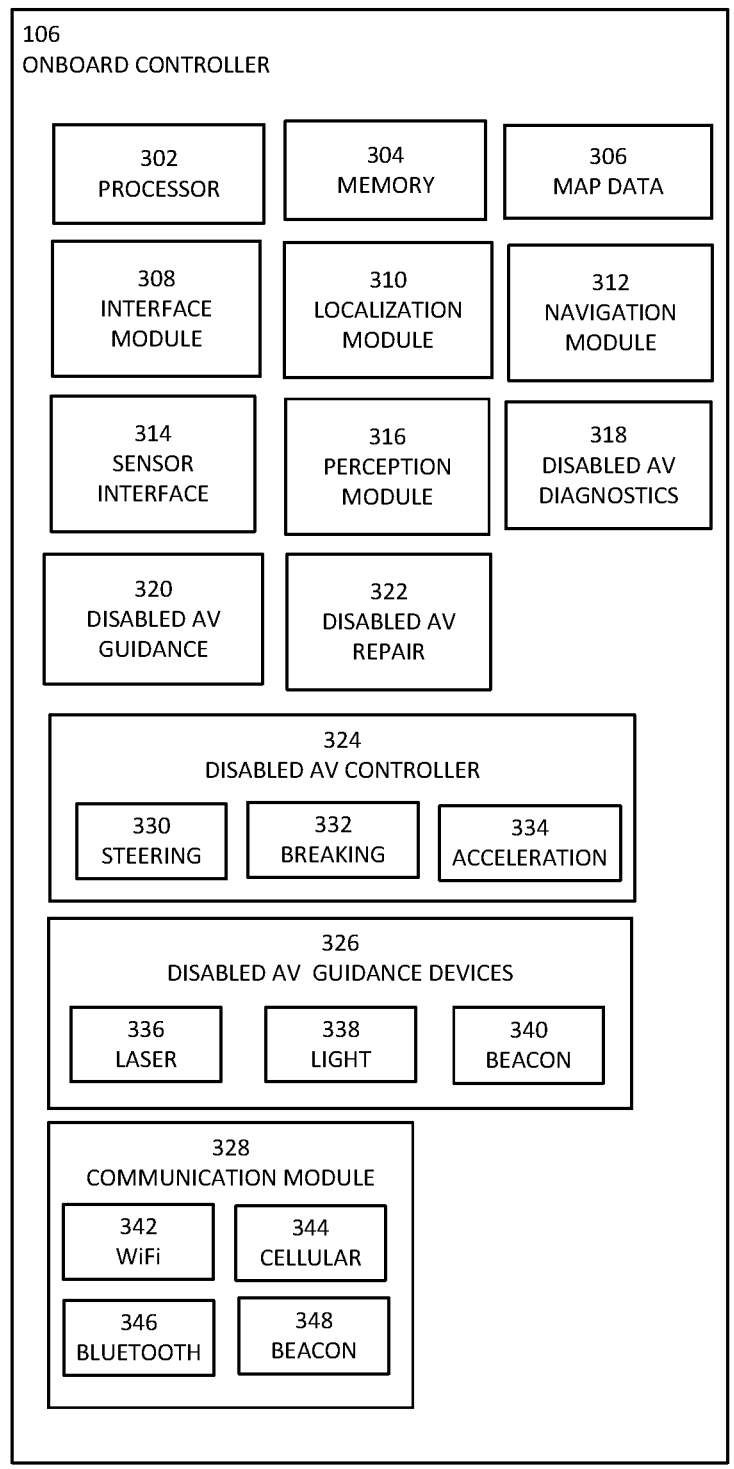
FIG. 3 illustrates an onboard controller of an autonomous vehicle according to some embodiments of the present disclosure.

FIG. 3 is a block diagram illustrating the onboard controller 106 (the onboard controllers 106*a* and 106*b*) of the AV 102 (the towing AV 102*a* and the disabled AV 102*b*) according to some embodiments of the present disclosure. The onboard controller 106 includes one or more processors 302, memory 304, map data 306, an interface module 308, a localization module 310, a navigation module 312, a sensor interface 314, a perception module 316, a disabled AV diagnostics module 318, a disabled AV guidance module 320, a disabled AV repair module 322, a disabled AV controller 324, one or more disabled AV guidance devices 326, and a communication module 328. The disabled AV controller 324 can be used when the towing AV 102*a* takes complete control of the disabled AV 102*b*. For example, the disabled AV controller 324 can include a steering module 330, a breaking module 332, and an acceleration module 334. In some examples, the disabled AV controller 324 can include other modules that can be used to take complete control of the disabled AV 102*b* (e.g., a headlight module, break light module, etc.). The disabled AV guidance devices 326 can include a laser 336, a beam of light 338, and a beacon 340. In some examples, the disabled guidance devices can include other devices that may be used as a guide for the disabled AV 102*b* to follow. The communication module 328 includes a WiFi communication module 342, a cellular communication module 344, a Bluetooth™ communication 346, and a beacon 348. In some examples, the communication module 328 can include other specific communication modules that can be used to facilitate communications with the AV 102 (e.g., a near field communication (NFC) module).

Beacon 340 and beacon 348 can be a relatively small, wireless transmitters that use low-energy Bluetooth™ technology to receive a signal from another beacon or transmit a signal to another beacon. For example, the beacon 348 on the towing AV 102*a* can transmit a signal to or receive a signal from the beacon 348 on the disabled AV 102*b*. In a towing example, the beacon 340 on the towing AV 102*a* can transmit a signal and the beacon 348 on the disabled AV 102*b* can receive and follow the signal.

Alternative configurations, different or additional components may be included in the Onboard controller 106. Further, functionality attributed to one component of the onboard controller 106 may be accomplished by a different component included in the AV 102 or a different system (e.g., fleet management system 1402). For example, components and modules for conducting route planning, controlling movements of the AV 102, and other vehicle functions are not shown in FIG. 3.

The map data 306 stores a detailed map that includes a current environment around the AV 102. If the AV 102 is a towing AV 102a, the map data 306 stores a detailed map that includes a current environment around the towing AV 102a and the disabled AV 102b. The map data 306 can be used by the AV 102 to navigate the AV 102 and/or to navigate the disabled AV 102b when the AV 102 is a towing AV 102a. The map data 306 may include any of the map data 1508 described in relation to FIG. 15. In some embodiments, the map data 306 stores a subset of the map data 1508, (e.g., map data for a city or region in which the AV 102 is located).

The interface module 308 facilitates bi-directional wired and wireless communications of the onboard controller 106 with other systems. For example, the interface module 308 supports communications of the onboard controller 106 with other systems (e.g., the onboard controller of a disabled AV 102b or fleet management system 1402). The interface module 308 supports communications of the onboard controller 106 with other components of the AV 102. For example, the interface module 142 may retrieve sensor data generated by the sensor suite 108, the sensor suite 108b of the disabled AV 102b if the AV 102 is a towing AV 102a, or by the sensor suite 108a of the towing AV 102a if the AV 102 is a disabled AV 102b and is using the sensor suite 108a of the towing AV 102a to supplement one or more sensors from the sensor suite 108b of the disabled AV 102b. The interface module 308 can communicate with the communication module 328 to help facilitate communications of the AV 102.

The localization module 310 localizes the AV 102. If the AV 102 is a towing AV 102a, the localization module 310 localizes the towing AV 102a and the disabled AV 102b. The localization module 310 may use sensor data generated by the sensor suite 108 to determine the current location of the AV 102. If the AV 102 is a towing AV 102a, the localization module 310 may use sensor data generated by the sensor suite 108a, and the sensor suite 108b, if available, to determine the current location of the towing AV 102a and the disabled AV 102b. The sensor data includes information describing an absolute or relative position of the AV 102 (e.g., data generated by GPS, global navigation satellite system (GNSS), IMU, etc.), information describing features surrounding the AV 102 (e.g., data generated by a camera, RADAR, SONAR, LIDAR, etc.), information describing motion of the AV 102 (e.g., data generated by the motion sensor), or some combination thereof. In some embodiments, the localization module 310 uses the sensor data to determine whether the AV 102 has entered a local area, such as a parking garage or parking lot where the AV 102 can be charged. In some other embodiments, the localization module 310 may send the sensor data to the fleet management system 1402 and receive from the fleet management system 1402 a determination whether the AV 102 has entered the local area.

In some embodiments, the localization module 310 determines whether the AV 102 is at a predetermined location (e.g., a destination of a ridehail/rideshare service). For example, the localization module 310 uses sensor data generated by the sensor suite 108 to determine the location of the AV 102. The localization module 310 may further compare the location of the AV 102 with the predetermined location to determine whether the AV 102 has arrived at a destination. The localization module 310 may provide locations of the AV 102 to the fleet management system 1402.

The localization module 310 can further localize the AV 102 within the local area. If the AV 102 is a towing AV 102a, the localization module 310 can further localize the towing AV 102a and the disabled AV 102b within the local area. For example, the localization module 310 determines a pose (position or orientation) of the AV 102 (or the towing AV 102a and the disabled AV 102b) in the local area. In some embodiments, the localization module 310 localizes the AV 102 within the local area by using a model of the local area. The model may be a 2D or 3D representation of the surrounding area, such as a map or a 3D virtual scene simulating the surrounding area. In various embodiments, the localization module 310 receives the model of the local area from the fleet management system 1402. The localization module 310 may send a request for the model to the fleet management system 1402 and in response, receive the model of the local area. In some embodiments, the localization module 310 generates the request based on sensor data indicating a position or motion of the AV 102. For example, the localization module 310 detects that the AV 102 is in the local area or is navigated to enter the local area based on the sensor data and sends out the request in response to such detection. This process can be dynamic. For example, the localization module 310 may send new request to the fleet management system 2102 as the AV 102 changes its position.

The localization module 310 may further localize the AV 102 with respect to an object in the local area. If the AV 102 is a towing AV 102a, the localization module 310 can further localize the towing AV 102a and the disabled AV 102b with respect to an object in the local area. An example of the object is a building in the local area. The localization module 310 may determine a pose of the AV 102 relative to the building based on features in the local area. For example, the localization module 310 retrieves sensor data from one or more sensors (e.g., camera, LIDAR, etc.) in the sensor suite 108 that detect the features in the environment of the AV 102. The localization module 310 uses the sensor data to determine the pose of the AV 102. The features may be lane markers, street curbs, driveways, and so on. A feature may be two-dimensional or three-dimensional.

The navigation module 312 controls motion of the AV 102. If the AV 102 is a towing AV 102a, the navigation module 312 can control motion of the towing AV 102a and the disabled AV 102b. The navigation module 312 may control the motor of the AV 102 to start, pause, resume, or stop motion of the AV 102. The navigation module 312 may further control the wheels of the AV 102 to control the direction the AV 102 will move. The navigation module 312 may also use the disabled AV controller 324 to control the disabled AV 102b. More specifically, the navigation module 312 can use the steering module 330 to control the steering of the disabled AV 102b, the breaking module 332 to control the breaking of the disabled AV 102b, and the acceleration module 334 to control the acceleration of the disabled AV 102b.

In various embodiments, the navigation module 312 generates a navigation route for the AV 102 based on a location of the AV 102, a destination, and a map. The navigation module 312 may receive the location of the AV 102 from the localization module 310. The navigation module 312 receives a request to go to a location and, using map data 306, generates a route to navigate the AV 102 from its current location, which is determined by the localization module 310, to the location. The navigation module 312 may receive the destination from the fleet management system 1402, through the interface module 308. In some examples, the navigation module 312 generates a navigation route for the disabled AV 102b based on a location of the AV 102 and/or the disabled AV 102b, a destination, and a map (e.g., from the map data 306).

The sensor interface 314 interfaces with the sensors in the sensor suite 108. If the AV 102 is a towing AV 102a, the sensor interface 314 interfaces with the sensors of the sensor suite 108a and, if possible, the sensor suite 108b of the disabled AV 102b. If the AV 102 is a disabled AV 102b, if possible, the sensor interface 314 interfaces with the sensors of the sensor suite 108b and with the sensor suite 108a of the towing AV 102a. The sensor interface 314 may request data from the sensor suite 108 (e.g., by requesting that a sensor capture data in a particular direction or at a particular time). If the AV 102 is a towing AV 102a, the sensor interface 314 may request data from the sensor suite 108a and, if possible, from the sensor suite 108b of the disabled AV 102b. If the AV 102 is a disabled AV 102b, if possible, the sensor interface 314 may request data from the sensor suite 108b and with the sensor suite 108a of the towing AV 102a. The sensor interface 314 is configured to receive data captured by sensors of the sensor suite 108. The sensor interface 314 may have subcomponents for interfacing with individual sensors or groups of sensors of the sensor suite 108, such as a camera interface, a LIDAR interface, a radar interface, a microphone interface, etc.

The perception module 316 identifies objects and/or other features captured by the sensor suite 108 of the AV 102. If the AV 102 is a towing AV 102a, the perception module 316 identifies objects and/or other features captured by the sensor suite 108a of the towing AV 102a and, if possible, by the sensor suite 108b of the disabled AV 102b. If the AV 102 is a disabled AV 102b, if possible, the perception module 316 identifies objects and/or other features captured by the sensor suite 108b and by the sensor suite 108a of the towing AV 102a. For example, the perception module 316 identifies objects in the environment of the AV 102 and captured by one or more sensors of the sensor suite 108. The perception module 316 may include one or more classifiers trained using machine learning to identify particular objects. For example, a multi-class classifier may be used to classify each object in the environment of the AV 102 as one of a set of potential objects, (e.g., a vehicle, a pedestrian, or a cyclist). As another example, a pedestrian classifier recognizes pedestrians in the environment of the AV 102, a vehicle classifier recognizes vehicles in the environment of the AV 102, etc. The perception module 316 may identify travel speeds of identified objects based on data from a radar sensor, (e.g., speeds at which other vehicles, pedestrians, or birds are traveling). As another example, the perception module 316 may identify distances to identified objects based on data (e.g., a captured point cloud) from a LIDAR sensor, (e.g., a distance to a particular vehicle, building, or other feature identified by the perception module 316). The perception module 316 may also identify other features or characteristics of objects in the environment of the AV 102 based on image data or other sensor data, for example, colors (e.g., the color of a specific building or house), sizes (e.g., heights of people or buildings in the environment), makes and models of vehicles, pictures and/or words on billboards, etc.

In some embodiments, the perception module 316 fuses data from one or more sensors in the sensor suite 108 of the AV 102 and/or map data 306 to identify environmental features around the AV 102. While a single perception module 316 is shown in FIG. 3, in some embodiments, the onboard controller 106 may have multiple perception modules (e.g., different perception modules for performing different ones of the perception tasks described above (e.g., object perception, speed perception, distance perception, feature perception, facial recognition, mood determination, sound analysis, gaze determination, etc.).

The disabled AV diagnostics module 318 can be used by the towing AV 102a to perform diagnostic testing on the disabled AV 102b. In some examples, a two-way communication between the towing AV 102a and the disabled AV 102b is required. In some examples, the disabled AV diagnostics module 318 can run a full diagnostic on the disabled AV 102b. In other examples, the disabled AV diagnostics module 318 can run a critical systems diagnostic on the disabled AV 102b to determine if the disabled AV 102b has enough functionality to travel to a safe place. The disabled AV diagnostics module 318 can use one or more sensor from the sensor suite 108 to perform a visual inspection of the disabled AV 102b to identify any visual objects or conditions that may be the reasons the disabled AV 102b cannot move or properly function. In some examples, the results of diagnostic testing on the disabled AV 102b can be communicated to the fleet management system 1402 for further analysis and possible remediation solutions.

The disabled AV guidance module 320 can use one or more of the disabled AV guidance devices 326 provide a guidance laser, light beacon, or some other type of guidance for the disabled AV 102b to follow. More specifically, if one or more of the front sensors of the disabled AV 102b are working and the compute of the disabled AV 102b will allow the disabled AV 102b to travel, the disabled AV guidance module 320 can use one or more of the disabled AV guidance devices 326 to provide some other type of guidance signal for the disabled AV 102b to follow. By having the disabled AV 102b follow some type of guidance signal, the towing AV 102a does not need to take control of any of the disabled AVs 102b systems or functions.

The disabled AV repair module 322 can repair the disabled AV 102b if possible. For example, if the disabled AV 102b has a malfunctioning sensor interface module and the disabled AV diagnostics module 318 determines that resetting the malfunctioning sensor interface module may fix the issue, the disabled AV repair module 322 can reset the malfunctioning sensor interface module. In another example, if the disabled AV diagnostics module 318 determines that the disabled AV 102b has a flat tire, the disabled AV repair module 322 can activate a tire inflation mechanism (the tire inflation mechanism 502 illustrated in FIG. 5) to inflate the flat tire.

Example System Summary

Figure 4:
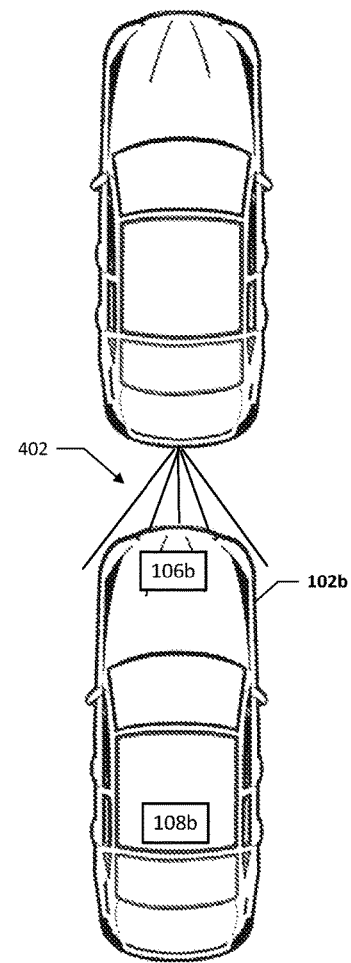
FIG. 4 illustrates an example system summary according to some embodiments of the present disclosure.

FIG. 4 illustrates the towing AV 102a emitting a guidance signal 402 for the disabled AV 102b to follow. For example, if one or more of the front sensors of the disabled AV 102b are working and the compute of the disabled AV 102b will allow the disabled AV 102b to travel, the disabled AV guidance module 320 can use one or more of the disabled AV guidance devices 326 to provide the guidance signal 402 for the disabled AV 102b to follow. The guidance signal 402 can be a laser, beam of light, beacon, or some other type of guidance signal for the disabled AV 102b to follow. By having the disabled AV 102b follow some type of guidance signal, the towing AV 102a does not need to take control of any of the disabled AVs 102b systems or functions.

Figure 5:
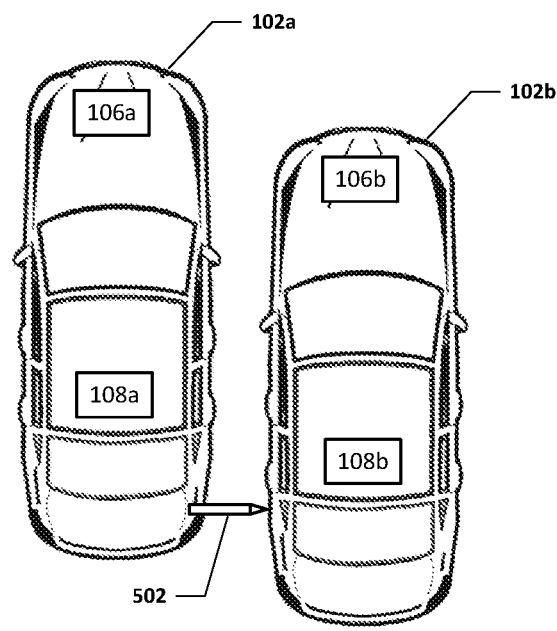
FIG. 5 illustrates an example system summary according to some embodiments of the present disclosure.

FIG. 5 illustrates the towing AV 102a using a tire inflation mechanism 502 being used to repair a flat tire on the disabled AV 102b. In an example, the towing AV 102a arrived at the destination of the disabled AV 102b. The towing AV 102a can use the disabled AV diagnostics module 318 to perform diagnostic testing on the disabled AV 102b.

More specifically, one of the diagnostics the disabled AV diagnostics module 318 may perform is a visual inspection of the disabled AV 102b using one or more sensors from the sensor suite 108a. In the example illustrated in FIG. 5, the disabled AV diagnostics module 318 can determine that the disabled AV 102b has a flat tire. Using the disabled AV repair module 322 to activate the tire inflation mechanism 502, an expanding foam or some other material can be injected into the flat tire to temporally expand the tire and allow the disabled AV 102b to travel to a safe location.

Figure 6:
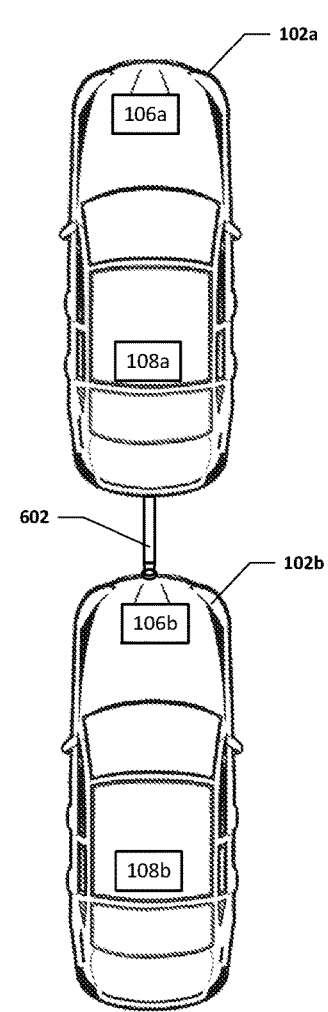
FIG. 6 illustrates an example system summary according to some embodiments of the present disclosure.

FIG. 6 illustrates the towing AV 102a using a physical towing mechanism 602 to physically tow the disabled AV 102b. In an example, the towing AV 102a arrived at the destination of the disabled AV 102b. The towing AV 102a can use the disabled AV diagnostics module 318 to perform diagnostic testing on the disabled AV 102b. In an example, the disabled AV diagnostics module 318 can determine that the disabled AV 102b has a complete system failure and is unable to be repaired. In another example, a two-way communication may not be able to be established with the disabled AV 102b and the towing AV 102a is unable to determine the reason the disabled AV 102b is disabled. As illustrated in FIG. 6, the disabled AV repair module 322 can activate the physical towing mechanism 602 and allow the towing AV 102a to physically tow the disabled AV 102b to a safe location. In an example, the physical towing mechanism 602 can include a magnet that magnetically attaches to the disabled AV 102b with enough force to allow the towing AV 102a to physically tow the disabled AV 102b. In another example, the physical towing mechanism 602 can include a hook or some other mechanical attachment that can attached to a ring or some other attachment device on the disabled AV 102b to allow the towing AV 102a to physically tow the disabled AV 102b.

Figure 7A:
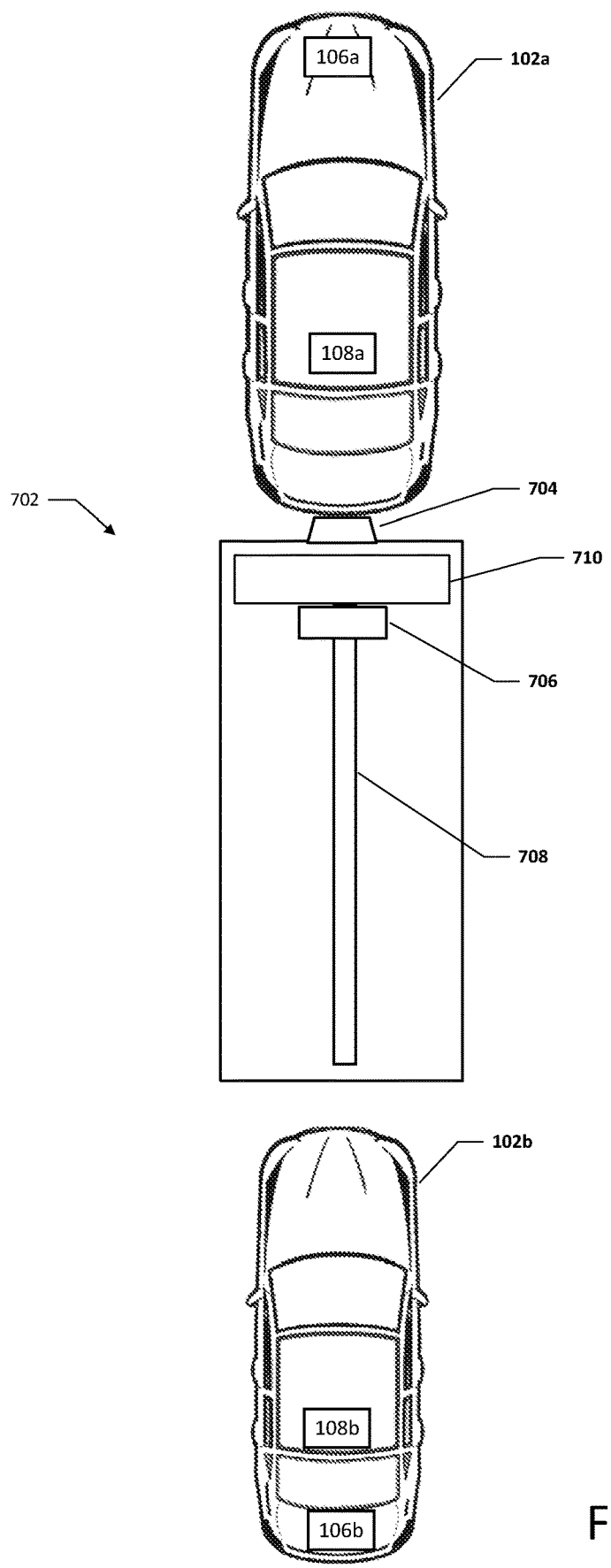
FIGS. 7A-7D illustrate an example system summary according to some embodiments of the present disclosure.
Figure 7B:
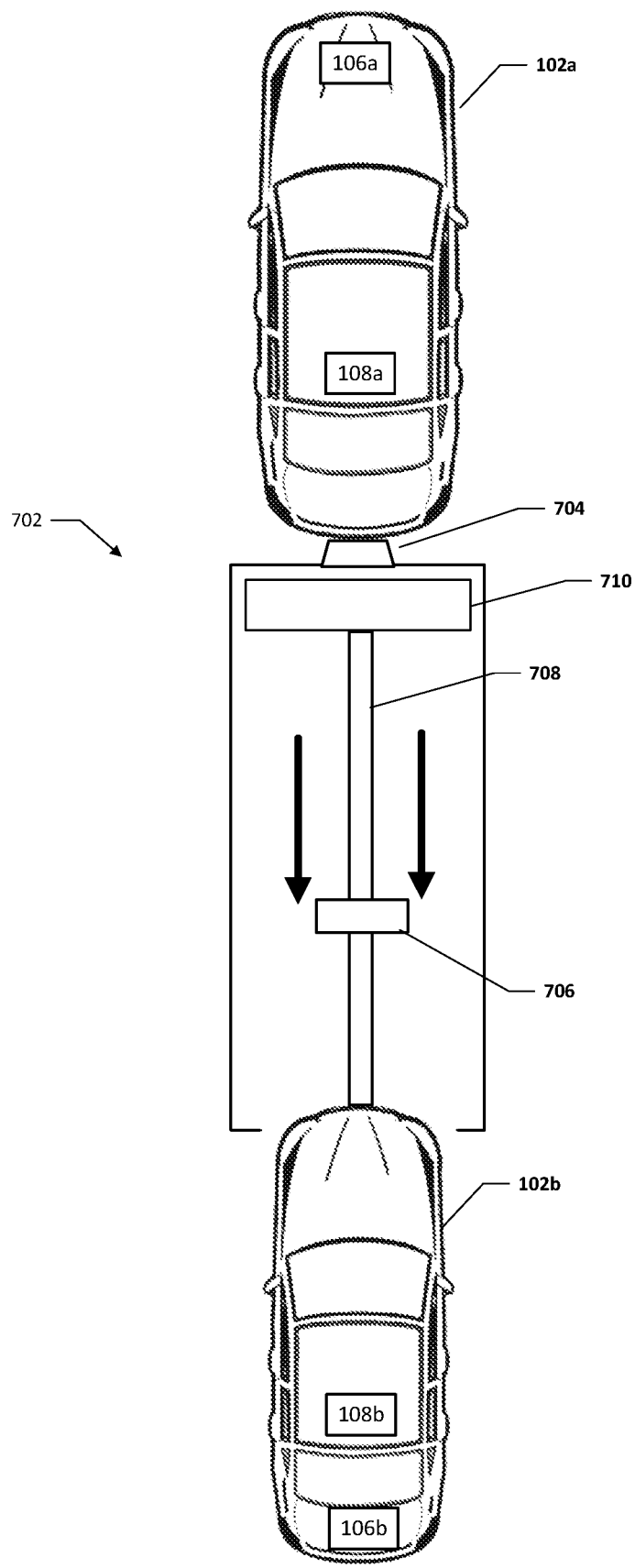

FIGS. 7A-7B illustrate the towing AV 102a using a physical towing trailer 702. In an example, the physical towing trailer 702 can be removably coupled to the towing AV 102a using a trailer hitch 704. The physical towing trailer 702 can be pulled from the towing AV 102a using the trailer hitch 704. The physical towing trailer 702 can include a disabled AV retrieval mechanism 706. The disabled AV retrieval mechanism 706 can travel the length of the trailer along a retrieval mechanism guide 708. A trailer control unit 710 can control the disabled AV retrieval mechanism 706 as it travels along the retrieval mechanism guide 708. In some examples, the physical towing trailer 702 is built into a special built AV 102 and the physical towing trailer 702 and special built AV 102 are a single unit towing AV.

In an example, the towing AV 102a arrived at the destination of the disabled AV 102b. The towing AV 102a can use the disabled AV diagnostics module 318 to perform diagnostic testing on the disabled AV 102b. In an example, the disabled AV diagnostics module 318 can determine that the disabled AV 102b has a complete system failure and is unable to be repaired. In another example, a two-way communication may not be able to be established with the disabled AV 102b and the towing AV 102a is unable to determine the reason the disabled AV 102b is disabled. As illustrated in FIG. 7A, the towing AV 102a can position the physical towing trailer 702 in front of the disabled AV 102b.

As illustrated in FIG. 7B, the disabled AV retrieval mechanism 706 can travel along the retrieval mechanism guide 708 towards the disabled AV 102b. In addition, an edge of the physical towing trailer 702 near the disabled AV 102b can be lowered or tilted down to allow the disabled AV 102b to be moved onto the physical towing trailer 702. In some examples, the trailer control unit 710 can autonomously control the disabled AV retrieval mechanism 706 as it travels along the retrieval mechanism guide 708 and the tilt of the physical towing trailer 702. In other examples, the towing AV 102a can control the disabled AV retrieval mechanism 706 and the tilt of the physical towing trailer 702 by sending command signals to the trailer control unit 710.

Once the disabled AV retrieval mechanism 706 has reached the disabled AV 102b, the disabled AV retrieval mechanism 706 can secure itself to the disabled AV 102b. In an example, the disabled AV retrieval mechanism 706 can include a magnet or magnets that magnetically attaches to the disabled AV 102b with enough force to allow the disabled AV retrieval mechanism 706 to physically pull or move the disabled AV 102b onto the physical towing trailer 702. In another example, the disabled AV retrieval mechanism 706 can include a hook, hooks, or some other mechanical attachment that can attached to a ring or some other attachment device on the disabled AV 102b to allow the disabled AV retrieval mechanism 706 to physically pull or move the disabled AV 102b onto the physical towing trailer 702.

Figure 7C:
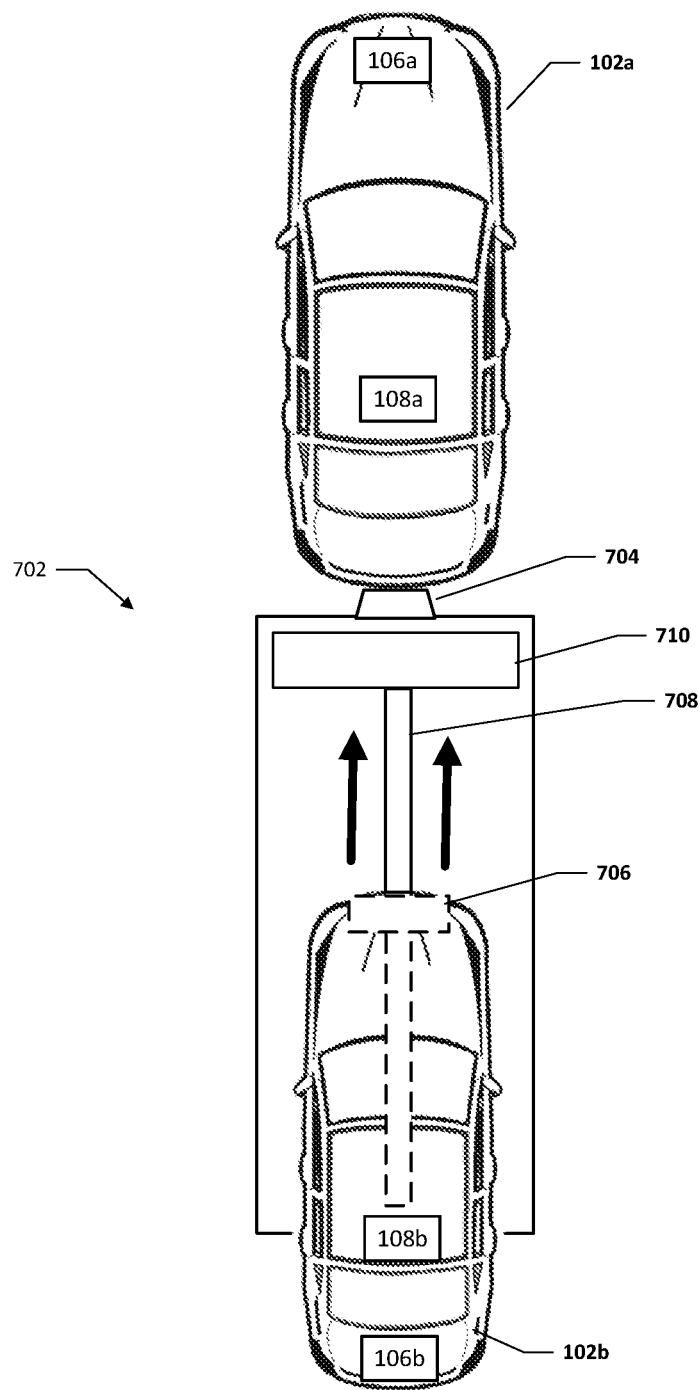
Figure 7D:
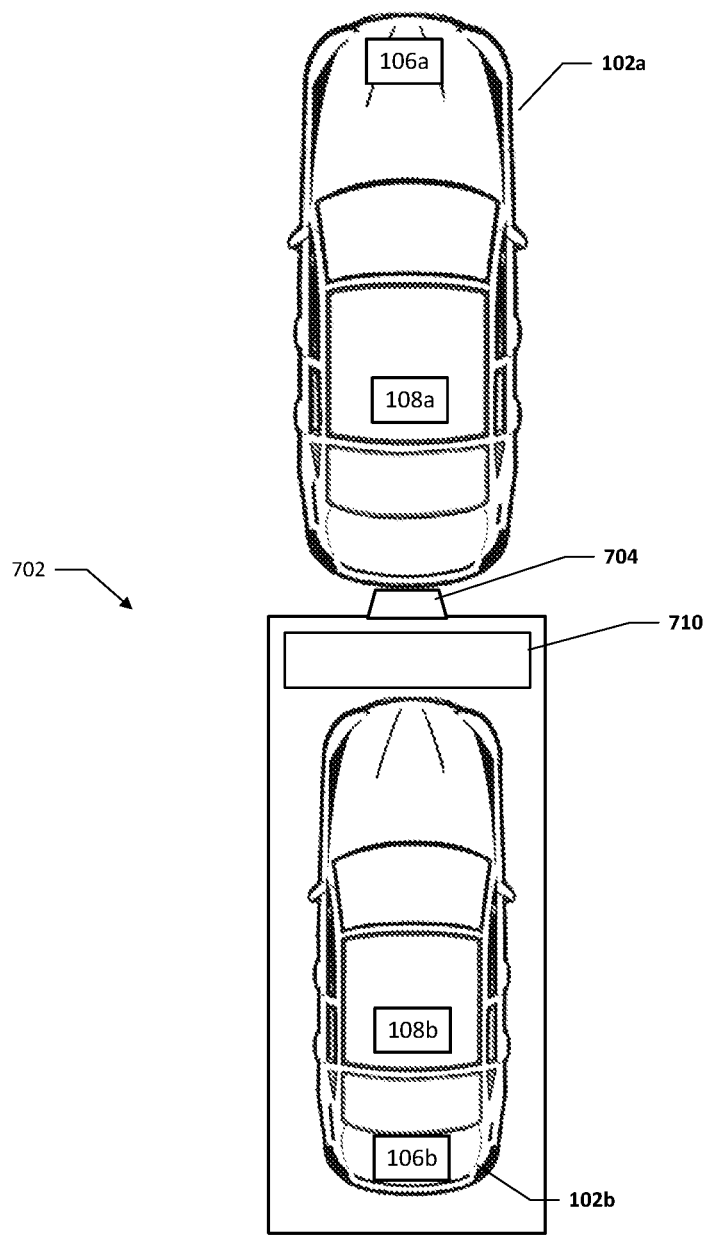

As illustrated in FIG. 7C, after the disabled AV retrieval mechanism 706 has been secured to the disabled AV 102b, the disabled AV retrieval mechanism 706 can travel along the retrieval mechanism guide 708 towards the front of the physical towing trailer 702 to physically pull or move the disabled AV 102b onto the physical towing trailer 702. As illustrated in FIGURE D, once the disabled AV 102b is on the trailer and secure, the towing AV 102a can physically tow the physical towing trailer 702 and the disabled AV 102b to a repair facility or some other safe location.

Example Process

Figure 8:
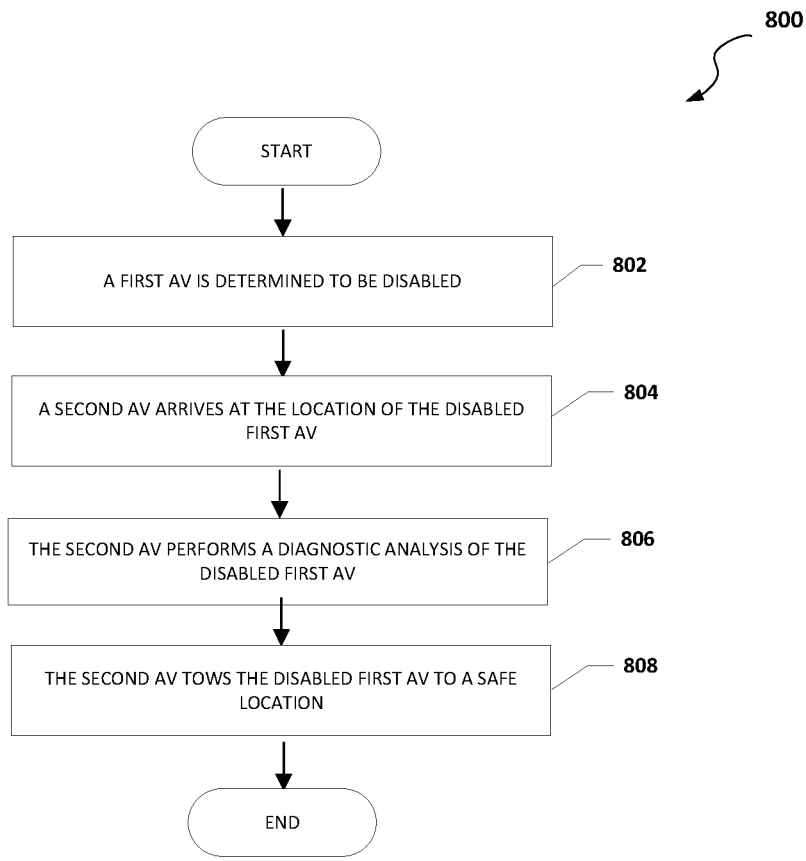
FIG. 8 is a flowchart showing a process for using a system and method to help enable an autonomous towing vehicle according to some embodiments of the present disclosure.

FIG. 8 is an example flowchart illustrating possible operations of a flow 800 that may be associated with a system and method to help enable an autonomous towing vehicle, in accordance with an embodiment. In an embodiment, one or more operations of flow 800 may be performed by the towing AV 102a, the Onboard controller 106, the sensor suite 108, and the fleet management system 1402.

At 802, a first AV is determined to be disabled. For example, an AV 102 can become a disabled AV 102b. After the AV 102 becomes a disabled AV 102b, the disabled AV 102b may send a signal to the fleet management system 1402 that it is disabled or the fleet management system 1402 could infer that the disabled AV 102b is disabled after not receiving a status communication from the disabled AV 102b for some time. In another example, the disabled AV 102b may send a signal to a nearby AV 102 that indicates the disabled AV 102b is disabled.

At 804, a second AV arrives at the location of the disabled first AV. For example, a towing AV 102a can be dispatched to the last know location of the disabled AV 102b. In another example, if the disabled AV 102b has communication capabilities, the disabled AV 102b can send it location to fleet management system 1402 or to a nearby AV 102. In some examples, the disabled AV 102b may have sensor and/or compute issues and is unable to determine its current location and disabled AV 102b sends its the last known location and/or any other information that may be used to determine the location of the disabled AV 102b.

At 806, the second AV performs a diagnostic analysis of the disabled first AV. For example, after arriving at the location of the disabled AV 102b, the towing AV 102a can try to establish a two-way communication with the disabled AV 102b. If a two-way communication can be established, the towing AV 102a can use the disabled AV diagnostics module 318 to perform diagnostic testing on the disabled AV 102b. The towing AV 102a can also perform a visual diagnostic analysis of the disabled AV 102b to try and determine any physical reasons the disabled AV 102b may be disabled. If a two-way communication cannot be established, the towing AV 102a can try to establish a one-way communication with the disabled AV 102b. Using the one-way communication, the towing AV 102a may try to reboot one or more systems on the disabled AV 102b to resolve the issue or reason as to why the disabled AV 102b is disabled.

At 808, the second AV tows the disabled first AV to a safe location. The particular actions taken by the towing AV 102a to help resolve the issues with the disabled AV 102b and tow (either virtually or physically) the disabled AV 102b to a safe location will depend on the nature of the failure mode for the disabled AV 102b. For example, if the disabled AV 102b is disabled due to one or more perception sensors not operating properly, the towing AV 102a may be able to make use of its own perception and planning capabilities and supplement the disabled sensors of the disabled AV 102b to allow the disabled AV 102b to navigate and travel to a safe location. In another example, the towing AV 102a may perform the route planning and navigation for the disabled AV 102b. In yet another example, the towing AV 102a may take complete control of the systems of the disabled AV 102b and the towing AV 102a could modify its own internal planning and controls capabilities to include information regarding the disabled AV 102b and navigate the disabled AV 102b to a safe location. In some examples, the towing AV 102a does not have any communication with the disabled AV 102b, the entire system of the disabled AV 102b is disabled and cannot be repaired, the critical systems of the disabled AV 102b are disabled and cannot be repaired, or the disabled AV 102b is otherwise unable to move under its own power, the towing AV 102a can physically tow the disabled AV 102b to a safe location.

Figure 9:
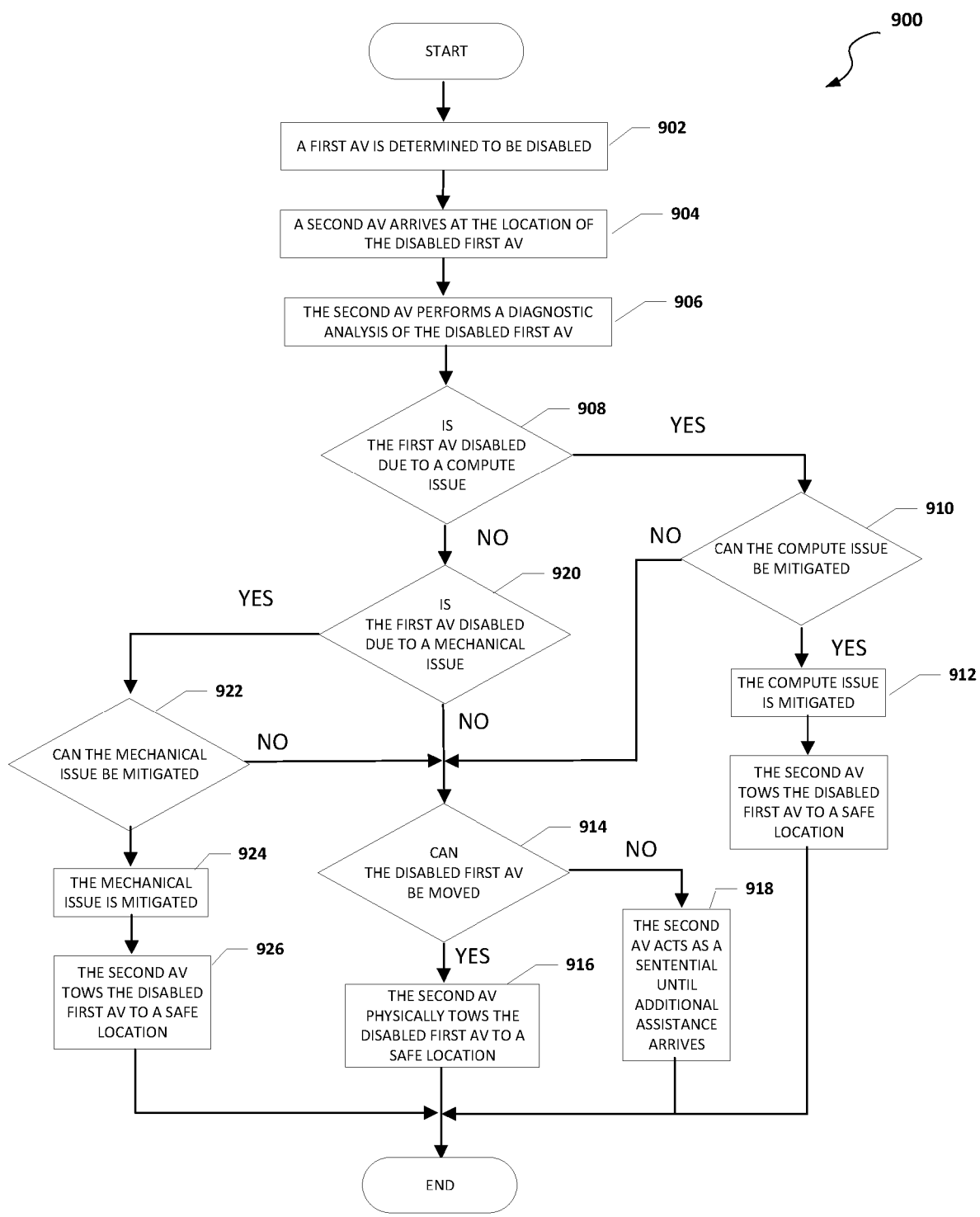
FIG. 9 is a flowchart showing a process for using a system and method to help enable an autonomous towing vehicle according to some embodiments of the present disclosure.

FIG. 9 is an example flowchart illustrating possible operations of a flow 900 that may be associated with a system and method to help enable an autonomous towing vehicle, in accordance with an embodiment. In an embodiment, one or more operations of flow 900 may be performed by the towing AV 102a, the Onboard controller 106, the sensor suite 108, and the fleet management system 1402.

At 902, a first AV is determined to be disabled. For example, an AV 102 can become a disabled AV 102b. After the AV 102 becomes a disabled AV 102b, the disabled AV 102b may send a signal to the fleet management system 1402 that it is disabled or the fleet management system 1402 could infer that the disabled AV 102b is disabled after not receiving a status communication from the disabled AV 102b for some time. In another example, the disabled AV 102b may send a signal to a nearby AV 102 that indicates the disabled AV 102b is disabled.

At 904, a second AV arrives at the location of the disabled first AV. For example, a towing AV 102a can be dispatched to the last known location of the disabled AV 102b. In another example, if the disabled AV 102b has communication capabilities, the disabled AV 102b can send it location to the fleet management system 1402 or to a nearby AV 102. In some examples, the disabled AV 102b may have sensor and/or compute issues and is unable to determine its current location and disabled AV 102b sends its the last known location and/or any other information that may be used to determine the location of the disabled AV 102b.

At 906, the second AV performs a diagnostic analysis of the disabled first AV. For example, after arriving at the location of the disabled AV 102b, the towing AV 102a establishes a two-way communication with the disabled AV 102b and the towing AV 102a can use the disabled AV diagnostics module 318 to perform diagnostic testing on the disabled AV 102b. The towing AV 102a can also perform a visual diagnostic analysis of the disabled AV 102b to try and determine any physical reasons the disabled AV 102b may be disabled.

At 908, the system determines if the first AV is disabled due to a compute issue. For example, based on the results of the diagnostic testing by the disabled AV diagnostics module 318, one or more compute modules on the disabled AV 102b may be disabled. For example, the navigation module 312, the sensor interface 314, and/or the perception module 316 may be disabled. If the first AV is disabled due to a compute issue, the system determines if the compute issue can be mitigated, as in 910. If the compute issue can be mitigated, then the compute issue is mitigated as in 912 and the second AV tows the disabled first AV to a safe location. For example, if the disabled AV 102b is disabled due to an issue with the navigation module 312, the sensor interface 314, and/or the perception module 316, the towing AV 102a can either reboot the navigation module 312, the sensor interface 314, and/or the perception module 316 to try and fix the issue or the towing AV 102a may take over the functions of the navigation module 312, the sensor interface 314, and/or the perception module 316 in the disabled AV 102b to allow the disabled AV 102b to be towed to a safe location.

If the compute issue cannot be mitigated, then the system determines if the disabled first AV can be moved, as in 914. For example, using the disabled AV diagnostics module 318 and a visual inspection of the disabled AV 102b, the towing AV 102a can determine if the disabled AV 102b can be moved. If the second AV can be moved, then the second AV physically tows the disabled first AV to a safe location, as in 916. For example, the towing AV 102a can use the physical towing mechanism 602 illustrated in FIG. 6, the physical towing trailer 702 illustrated in FIGS. 7A-7D, or some other means to physically tow the disabled AV 102b to a safe location. If the first disabled AV is not able to be moved, then the second AV acts as a sentential until additional assistance arrives, as in 918. For example, if the disabled AV 102b is unable to be moved, the towing AV 102a can request additional assistance from the fleet management system 1402, guard the disabled AV 102b and try to mitigate any safety hazards caused by the disabled AV 102b. For example, if the disabled AV 102b is stopped in the middle of a road, the towing AV 102a can use flashing lights or hazard lights to warn oncoming vehicles about the disabled AV 102b.

Going back to 908, if the first AV is not disabled due to a compute issue, then the system determines if the first AV is disabled due to a mechanical issue, as in 920. For example, the towing AV 102a may use one or more sensor from the sensor suite 108a on the towing AV 102a to determine the disabled AV 102b is disabled due to a mechanical issue. If the first AV is not disabled due to a mechanical issue, then the system determines if the first disabled AV can be moved, as in 914.

If the first AV is disabled due to a mechanical issue, then the system determines if the mechanical issue can be mitigated, as in 922. If the mechanical issue cannot be mitigated, then the system determines if the disabled first AV can be moved, as in 914. If the mechanical issue can be mitigated, then the mechanical issue is mitigated, as in 924 and the second AV tows the disabled first AV to a safe location. For example, if the disabled AV 102b is disabled due to a flat tire, the towing AV 102*a* can use the tire inflation mechanism 502 to temporarily expand the tire and allow the disabled AV 102*b* to travel to a safe location.

Figure 10:
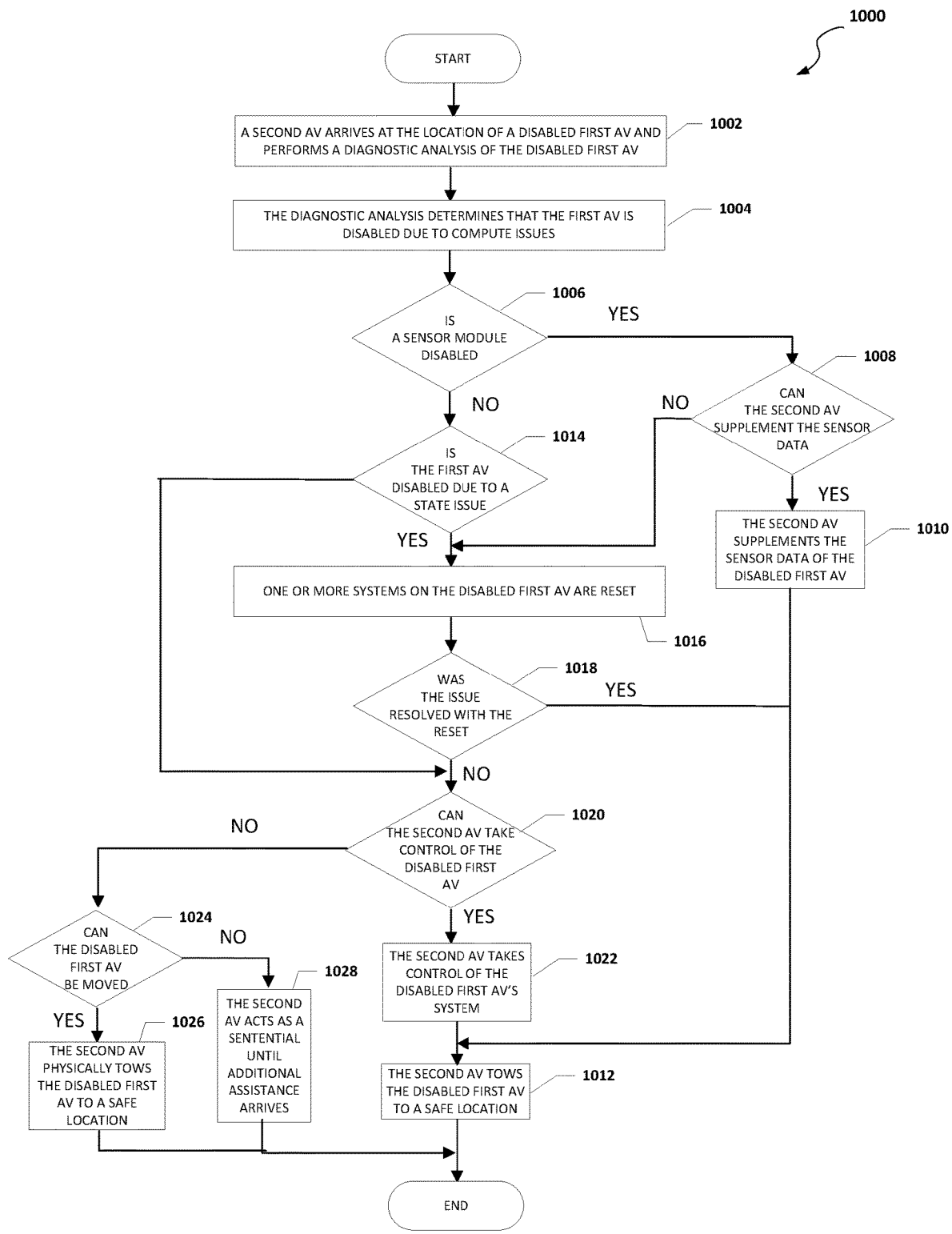
FIG. 10 is a flowchart showing a process for using a system and method to help enable an autonomous towing vehicle according to some embodiments of the present disclosure.

FIG. 10 is an example flowchart illustrating possible operations of a flow 1000 that may be associated with a system and method to help enable an autonomous towing vehicle, in accordance with an embodiment. In an embodiment, one or more operations of flow 1000 may be performed by the towing AV 102*a*, the Onboard controller 106, the sensor suite 108, and the fleet management system 1402.

At 1002, a second AV arrives at the location of a disabled first AV and performs a diagnostic analysis of the disabled first AV. For example, an AV 102 can become a disabled AV 102*b*. After the AV 102 becomes a disabled AV 102*b*, the towing AV 102*a* can be dispatched to the location of the disabled AV 102*b*. The towing AV 102*a* establishes a two-way communication with the disabled AV 102*b* and the towing AV 102*a* can use the disabled AV diagnostics module 318 to perform diagnostic testing on the disabled AV 102*b*.

At 1004, the diagnostic analysis determines that the first AV is disabled due to a compute issue. For example, based on the results of the diagnostic testing by the disabled AV diagnostics module 318, one or more compute modules on the disabled AV 102*b* may be disabled.

At 1006, the system determines if a sensor module is disabled. If a sensor module is disabled, then the system determines if the second AV can supplement the sensor data from the disabled sensor module, as in 1008. If the second AV can supplement the sensor data, then the second AV supplements the sensor data of the disabled first AV, as in 1010 and the second AV tows the disabled first AV to a safe location, as in 1012. For example, if the sensor interface 314, on the disabled AV 102*b*, then the towing AV 102*a* may take over the functions of the sensor interface 314 on the disabled AV 102*b* or supplement the sensor data of the disabled AV 102*b* to all the towing AV 102*a* to tow the disabled AV 102*b* to a safe location. If the second AV cannot supplement the sensor data, then one or more systems on the disabled first AV are reset, as in 1016. For example, the sensor interface 314 in the disabled AV 102*b* may be reset.

Going back to 1006, if a sensor module is not disabled, then the system determines if the first AV is disabled due to a state issue, as in 1014. For example, stack in each AV 102 is based on previous states. If an AV 102 enters into a stuck state, the AV in the stuck state will become a disabled AV 102*b* and will not have where the prior perceptions and will become disabled. If the first AV is disabled due to a state issue, one or more systems on the disabled first AV are reset, as in 1016. For example, if the disabled AV 102*b* is disabled due to a stuck state, the towing AV can reset the stack and provide a good viable state to the disabled AV 102*b* to unstick the stack.

At 1018, the system determines if the issue was resolved with the reset. For example, if the sensor interface 314 is in the disabled AV 102*b* was malfunctioning and rest, the system can determine if the reset sensor interface 314 is not functioning. Also, if the disabled AV 102*b* was in a stuck state, the system can determine if resetting the stack provided a viable stack. If the issue was resolved with the reset, then the second AV tows the disabled first AV to a safe location, as in 1012. For example, even though the issue is resolved, the towing AV 102*a* can tow the disabled AV 102*b* to a safe location such as a repair facility for further diagnostics and repair. Also, even though the issue is resolved, the issue may occur again until more repairs are made to the disabled AV 102*b*.

If the issue was not resolved with the reset, then the system determines if the second AV can take control of the disabled first AV, as in 1020. Going back to 1014, if the first AV is not disabled due to a state issue, then then the system determines if the second AV can take control of the disabled first AV, as in 1020. If the second AV can take control of the disabled first AV, then the second AV takes control of the disabled first AV's system, as in 1022, and the second AV tows the disabled first AV to a safe location, as in 1012. For example, if the towing AV 102*a* is able to take full control of the system of the disabled AV 102*b*, or even enough control of the system of the disabled AV 102*b* to move the disabled AV 102*b*, the towing AV 102*a* takes control of the system of the disabled AV 102*b* and moves the disabled AV 102*b* to a safe location.

If the second AV is not able to take control of the disabled first AV, then the system determines if the disabled first AV can be moved, as in 1024. For example, using the disabled AV diagnostics module 318 and a visual inspection of the disabled AV 102*b*, the towing AV 102*a* can determine if the disabled AV 102*b* can be moved. If the second AV can be moved, then the second AV physically tows the disabled first AV to a safe location, as in 1026. For example, the towing AV 102*a* can use the physical towing mechanism 602 illustrated in FIG. 6, the physical towing trailer 702 illustrated in FIGS. 7A-7D, or some other means to physically tow the disabled AV 102*b* to a safe location. If the first disabled AV is not able to be moved, then the second AV acts as a sentential until additional assistance arrives, as in 1028. For example, if the disabled AV 102*b* is unable to be moved, the towing AV 102*a* can request additional assistance from the fleet management system 1402, guard the disabled AV 102*b* and try to mitigate any safety hazards caused by the disabled AV 102*b*. For example, if the disabled AV 102*b* is stopped in the middle of a road, the towing AV 102*a* can use flashing lights or hazard lights to warn oncoming vehicles about the disabled AV 102*b*.

Figure 11:
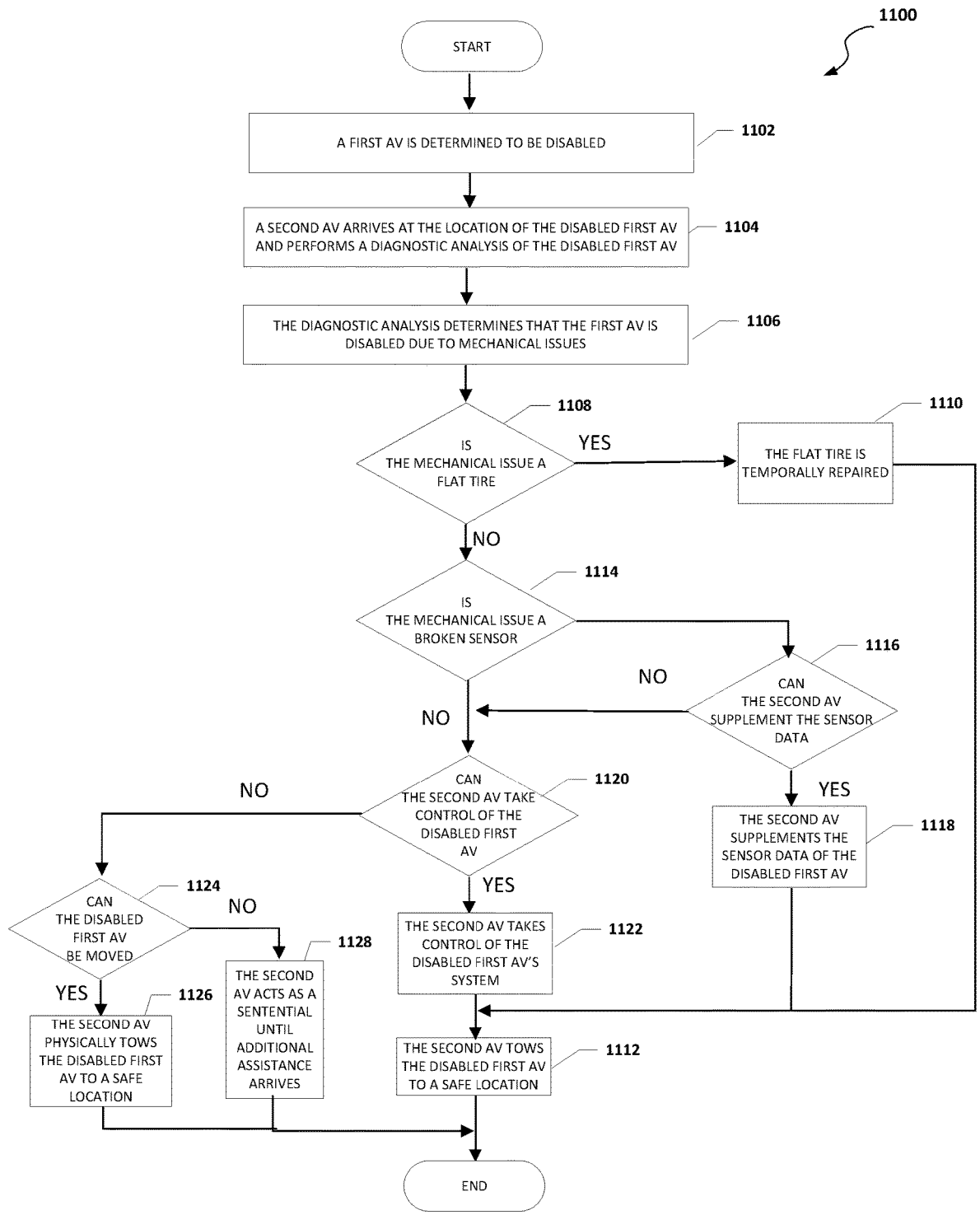
FIG. 11 is a flowchart showing a process for using a system and method to help enable an autonomous towing vehicle according to some embodiments of the present disclosure.

FIG. 11 is an example flowchart illustrating possible operations of a flow 1100 that may be associated with a system and method to help enable an autonomous towing vehicle, in accordance with an embodiment. In an embodiment, one or more operations of flow 1100 may be performed by the towing AV 102*a*, the Onboard controller 106, the sensor suite 108, and the fleet management system 1402.

At 1102, a first AV is determined to be disabled. For example, an AV 102 can become a disabled AV 102*b*. After the AV 102 becomes a disabled AV 102*b*, the disabled AV 102*b* may send a signal to the fleet management system 1402 that it is disabled or the fleet management system 1402 could infer that the disabled AV 102*b* is disabled after not receiving a status communication from the disabled AV 102*b* for some time. In another example, the disabled AV 102*b* may send a signal to a nearby AV 102 that indicates the disabled AV 102*b* is disabled.

At 1102, a second AV arrives at the location of a disabled first AV and performs a diagnostic analysis of the disabled first AV. For example, an AV 102 can become a disabled AV 102*b*. After the AV 102 becomes a disabled AV 102*b*, the towing AV 102*a* can be dispatched to the location of the disabled AV 102*b*. The towing AV 102*a* establishes a two-way communication with the disabled AV 102*b* and the towing AV 102*a* can use the disabled AV diagnostics module 318 to perform diagnostic testing on the disabled AV 102*b*. In addition, disabled AV diagnostics module 318 can use one or more sensor from the sensor suite 108 to perform a visual inspection of the disabled AV 102*b* to identify any visual objects or conditions that may be the reasons the disabled AV 102b cannot move or properly function and is disabled.

At 1106, the diagnostic analysis determines that the first AV is disabled due to a mechanical issue. For example, based on the results of the diagnostic testing by the disabled AV diagnostics module 318, a visual inspection may have detected or one or more mechanical issues with the disabled AV 102b.

At 1108, the system determines if the mechanical issue is a flat tire. If the mechanical issue is a flat tire, then the flat tire is temporally repaired, as in 1110 and the second AV tows the disabled first AV to a safe location, as in 1012. For example, based on a visual inspection by one or more sensors from the sensor suite 108a of the towing AV 102a, the disabled AV diagnostics module 318 can detect that the disabled AV 102b has a flat tire. Using the disabled AV repair module 322 to activate the tire inflation mechanism 502, an expanding foam or some other material can be injected into the flat tire to temporally expand the tire and allow the disabled AV 102b to travel to a safe location.

If the mechanical issue is not a flat tire, then the system determines if the mechanical issue is a broken sensor, as in 1114. For example, during the diagnostic testing by the disabled AV diagnostics module 318, a visual inspection may have detected a broken sensor from the sensor suite 108b of the disabled AV 102b. In another example, during the diagnostic testing by the disabled AV diagnostics module 318, the sensor interface 314 may indicate a broken or malfunctioning sensor. If the mechanical issue is a broken sensor, then the system determines if the second AV can supplement the sensor data of the disabled first AV, as in 1116. If the second AV can supplement the sensor data of the disabled first AV, then the second AV supplements the sensor data of the disabled first AV, as in 1118 and the second AV tows the disabled first AV to a safe location, as in 1012. For example, the towing AV 102a may take over the functions of the disabled sensor on the disabled AV 102b or supplement the sensor data of the disabled sensor on the disabled AV 102b to allow the towing AV 102a to tow the disabled AV 102b to a safe location. If the mechanical issue is not a broken sensor, then the system determines if the second AV can take control of the disabled first AV, as in 1120.

If the second AV cannot supplement the sensor data of the disabled first AV, then the system determines if the second AV can take control of the disabled first AV, as in 1120. If the second AV can take control of the disabled first AV, then the second AV takes control of the disabled first AV's system, as in 1122, and the second AV tows the disabled first AV to a safe location, as in 1112. For example, if the towing AV 102a is able to take full control of the system of the disabled AV 102b, or even enough control of the system of the disabled AV 102b to move the disabled AV 102b, the towing AV 102a takes control of the system of the disabled AV 102b and moves the disabled AV 102b to a safe location.

If the second AV is not able to take control of the disabled first AV, then the system determines if the disabled first AV can be moved, as in 1124. For example, using the disabled AV diagnostics module 318 and a visual inspection of the disabled AV 102b, the towing AV 102a can determine if the disabled AV 102b can be moved. If the second AV can be moved, then the second AV physically tows the disabled first AV to a safe location, as in 1126. For example, the towing AV 102a can use the physical towing mechanism 602 illustrated in FIG. 6, the physical towing trailer 702 illustrated in FIGS. 7A-7D, or some other means to physically tow the disabled AV 102b to a safe location. If the first disabled AV is not able to be moved, then the second AV acts as a sentential until additional assistance arrives, as in 1128. For example, if the disabled AV 102b is unable to be moved, the towing AV 102a can request additional assistance from the fleet management system 1402, guard the disabled AV 102b and try to mitigate any safety hazards caused by the disabled AV 102b. For example, if the disabled AV 102b is stopped in the middle of a road, the towing AV 102a can use flashing lights or hazard lights to warn oncoming vehicles about the disabled AV 102b.

Figure 12:
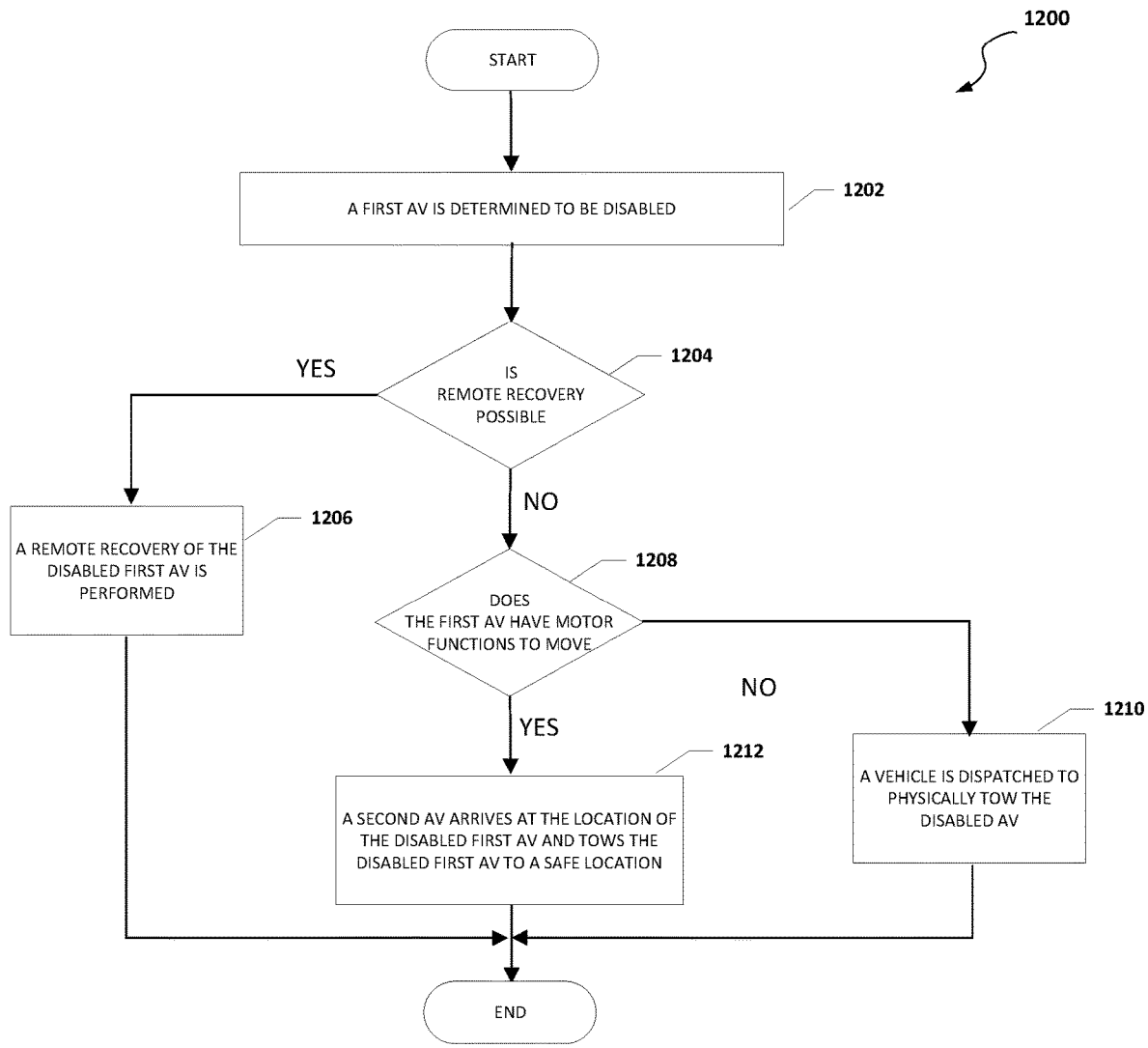
FIG. 12 is a flowchart showing a process for using a system and method to help enable an autonomous towing vehicle according to some embodiments of the present disclosure.

FIG. 12 is an example flowchart illustrating possible operations of a flow 1200 that may be associated with a system and method to help enable an autonomous towing vehicle, in accordance with an embodiment. In an embodiment, one or more operations of flow 1200 may be performed by the towing AV 102a, the Onboard controller 106, the sensor suite 108, and the fleet management system 1402.

At 1202, a first AV is determined to be disabled. For example, the disabled AV 102b can be determined to be disabled. At 1204, the system determines if remote recovery is possible. If remote recovery is possible, then a remote recovery of the disabled first AV is performed, as in 1206. For example, the disabled AV 102b can communicate with the fleet management system 1402 and a remote diagnostic can be performed. If the results indicate that the disabled AV 1022b can be recovered using a remote recovery processes, then the remote recovery process is performed. More specifically, if resetting one or more systems of the disabled AV 102b can recover the disabled AV 102b, then one or more systems of the disabled AV 102b can be remotely reset.

If remote recovery is not possible, then the system determines if the first AV has motor functions to move, as in 1208. If the first AV does not have the motor functions to move, then a vehicle is dispatched to physically tow the disabled AV, as in 1210. For examples, if the disabled AV 102b has a critical system failure and the wheels are locked, then the disabled AV 102b will need to be physically moved. To physically move the disabled AV 102b, a third-party tow truck can be dispatched to the disabled AV 102b or the towing AV 102a can use the physical towing mechanism 602 illustrated in FIG. 6, the physical towing trailer 702 illustrated in FIGS. 7A-7D, or some other means to physically tow the disabled AV.

If the first AV has motor functions to move, then a second AV arrives at the location of the disabled first AV and tows the disabled first AV to a safe location, as in 1212. For example, the towing AV 102a can arrive at the location of the disabled AV 102b and virtually tow the disabled AV 102b to a safe location. In some examples, after arriving at the location of the disabled AV 102b, the towing AV 102a can share sensor resources with the disabled AV 102b, fully take control of the disabled AV 102b, temporarily repair a flat tire on the disabled AV 102b, or provide some other temporary remedial action or "band-aid" to allow the disabled AV 102b to be towed to a safe location.

Figure 13:
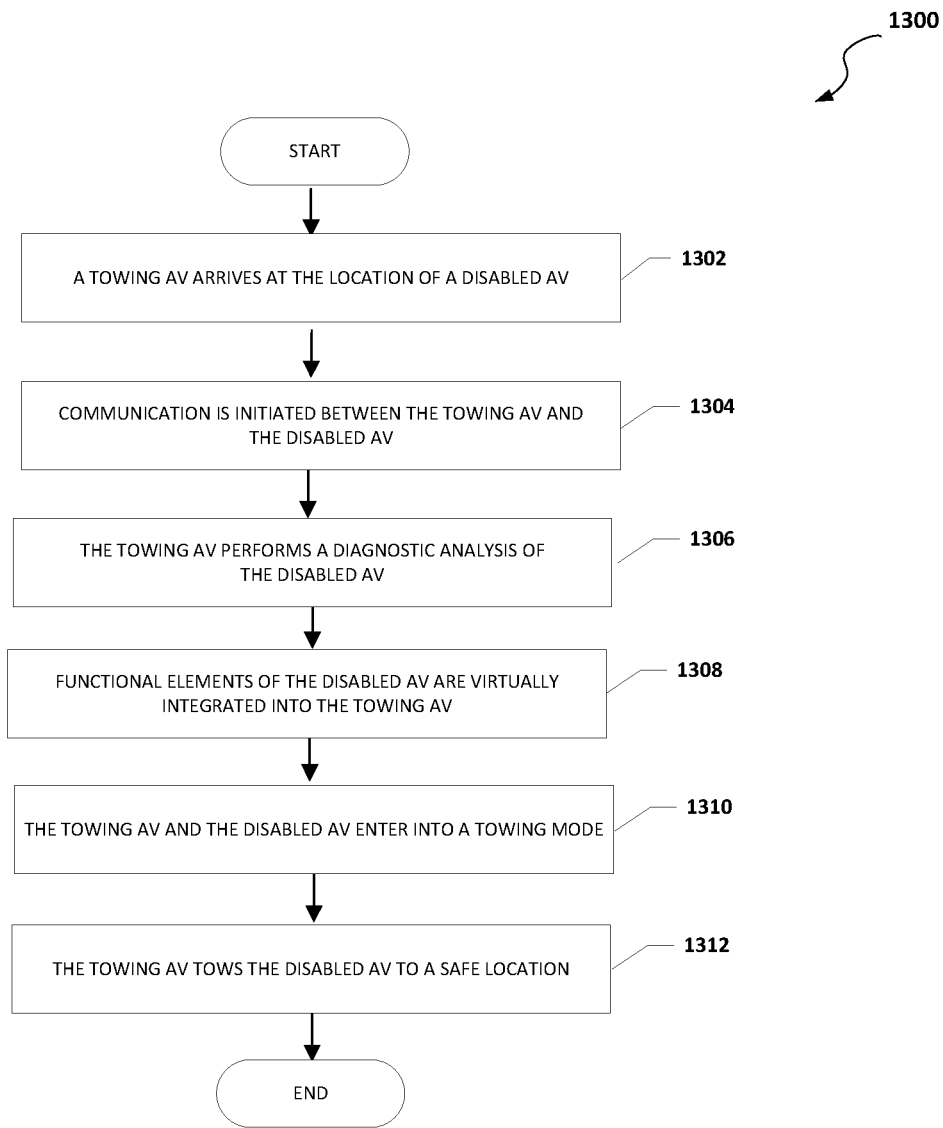
FIG. 13 is a flowchart showing a process for using a system and method to help enable an autonomous towing vehicle according to some embodiments of the present disclosure.

FIG. 13 is an example flowchart illustrating possible operations of a flow 1300 that may be associated with a system and method to help enable an autonomous towing vehicle, in accordance with an embodiment. In an embodiment, one or more operations of flow 1300 may be performed by the towing AV 102a, the Onboard controller 106, the sensor suite 108, and the fleet management system 1402.

At 1302, a towing AV arrives at the location of a disabled AV. For example, the towing AV 102a arrives at the location of the disabled AV 102b. At 1304, communication is initiated between the towing AV and the disabled AV. For example, the communication channel 104 can be established between the towing AV 102a and the disabled AV 102b. AT 1306, the towing AV performs a diagnostic analysis of the disabled AV. For example, the towing AV 102a can use the disabled AV diagnostics module 318 to perform diagnostic testing on the disabled AV 102b. At 1308, functional elements of the disabled AV are virtually integrated into the towing AV. For examples, the towing AV 102a can take over some of the functional elements of the disabled AV 102b that are disabled or compromised and are at least partially the cause of the disabled AV 102b being disabled. At 1310, the towing AV and the disabled AV enter into a towing mode and the towing AV tows the disabled AV to a safe location, as in 1312. For example, the towing AV 102a can supplement one or more functional elements of the disabled AV 102b and/or take remotely take control of one or more functional elements of the disabled AV 102b and tow the disabled AV 102b to a safe location.

Example Autonomous Vehicle System

Figure 14:
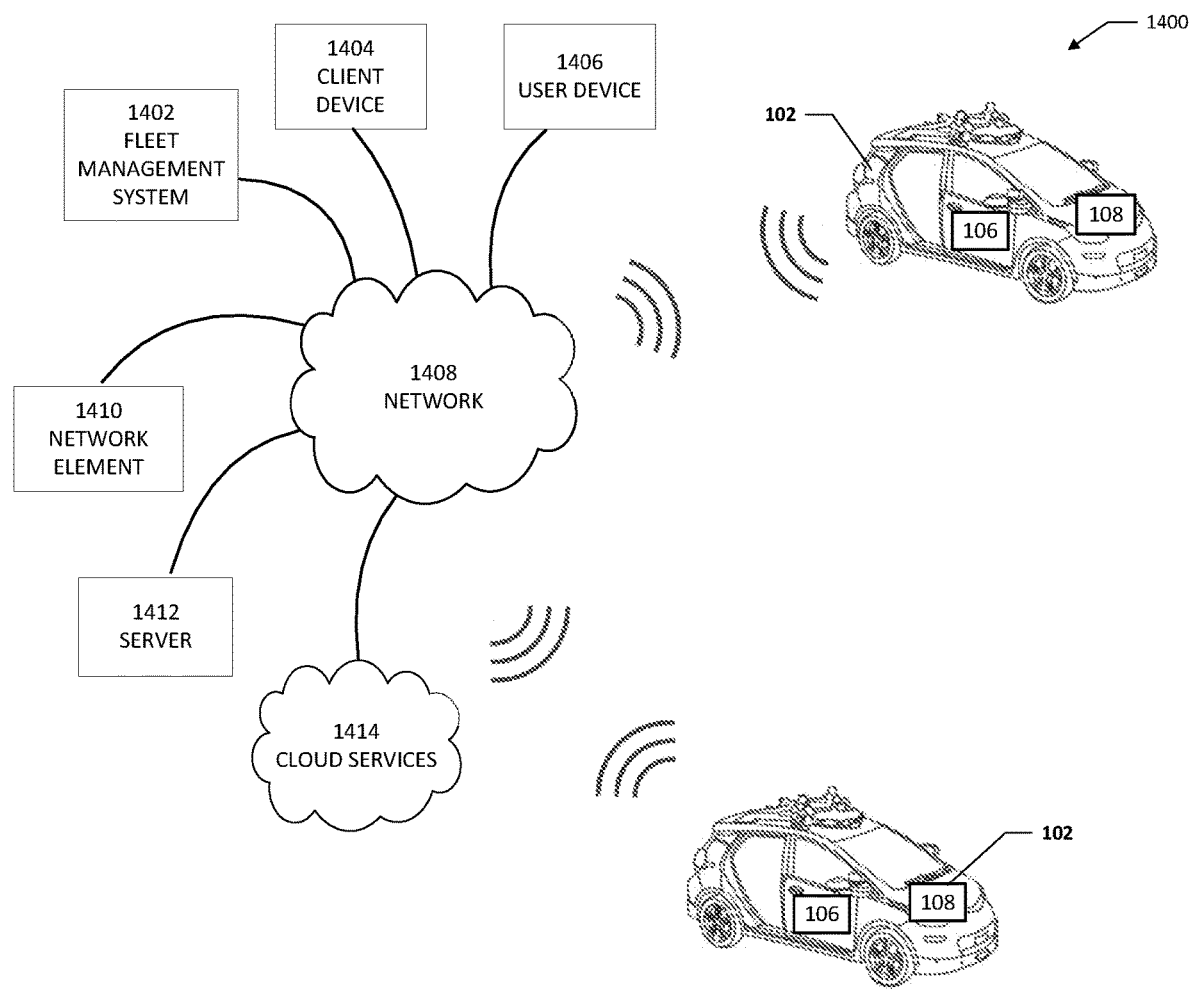
FIG. 14 shows an autonomous vehicle environment according to some embodiments of the present disclosure.

FIG. 14 shows an AV environment 1400 according to some embodiments of the present disclosure. The AV environment 1400 can include AVs 102, a fleet management system 1402, a client device 1404, and a user device 1406. Each of the AVs 102 can include the Onboard controller 106 and the sensor suite 108. The onboard controller 106 controls the AV 102 and helps facilitate communication with the AV 102. The sensor suite 108 detects the environment inside and outside of the AV 102 and generates sensor data describing the surround environment.

Each of the AVs 102, the fleet management system 1402, the client device 1404, and/or the user device 1406 can be in communication using network 1408. In addition, each of the AVs 102, the fleet management system 1402, the client device 1404, and/or the user device 1406 can be in communication with one or more network elements 1410, one or more servers 1412, and cloud services 1414 using the network 1408. In other embodiments, the AV environment 1400 may include fewer, more, or different components. For example, the AV environment 1400 may include a different number of AVs 102 with some AVs 102 including the onboard controller 106 and some AVs 102 not including the onboard controller 106 (not shown). A single AV is referred to herein as AV 102, and multiple AVs are referred to collectively as AVs 102. For purpose of simplicity and illustration, FIG. 14 shows one client device 1404 and one user device 1406. In other embodiments, the AV environment 1400 includes multiple third-party devices or multiple client devices.

In some embodiments, the AV environment 1400 includes one or more communication networks (e.g., network 1408) that supports communications between some or all of the components in the AV environment 1400. The network 1408 may comprise any combination of local area and/or wide area networks, using both wired and/or wireless communication systems. In one embodiment, the network uses standard communications technologies and/or protocols. For example, the network 1408 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 1408 may be represented using any suitable format, such as hypertext markup language (HTML) or extensible markup language (XML). In some embodiments, all or some of the communication links of the network 1408 may be encrypted using any suitable technique or techniques.

In some embodiments, an AV 102 includes the onboard controller 106 (illustrated in FIG. 3) and the sensor suite 108. The sensor suite 108 can include a computer vision ("CV") system, localization sensors, and driving sensors. For example, the sensor suite 108 may include interior and exterior cameras, radar sensors, sonar sensors, light detection and ranging (LIDAR) sensors, thermal sensors, wheel speed sensors, inertial measurement units (IMUS), accelerometers, microphones, strain gauges, pressure monitors, barometers, thermometers, altimeters, ambient light sensors, etc. The sensors may be located in various positions in and around the AV 102. For example, the AV 102 may have multiple cameras located at different positions around the exterior and/or interior of the AV 102.

An AV 102 may also include a rechargeable battery that powers the AV 102. The battery may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the AV 102 is a hybrid electric vehicle that also includes an internal combustion engine for powering the AV 102 (e.g., when the battery has low charge). In some embodiments, the AV 102 includes multiple batteries. For example, the AV 102 can include a first battery used to power vehicle propulsion, and a second battery used to power the onboard controller 106 and/or AV hardware (e.g., the sensor suite 108 and the Onboard controller 106). The AV 102 may further include components for charging the battery (e.g., a charge port configured to make an electrical connection between the battery and a charging station).

The fleet management system 1402 manages ridehail/rideshare services using the AVs 102. Generally, a ridehail/rideshare service is a service where users are picked up and dropped off in a vehicle (AV 102). The ridehail/rideshare service is typically arranged using a website or app.

The fleet management system 1402 may select an AV 102 from a fleet of AVs 102 to perform a particular ridehail, rideshare, and/or other tasks and instruct the selected AV 102 to autonomously drive to a particular location (e.g., an address to pick up a user). The fleet management system 1402 sends a ridehail/rideshare request to the AV 102. The ridehail/rideshare request includes information associate with the ridehail/rideshare service, information of a user requesting the ridehail/rideshare (e.g., location, identifying information, etc.), information of a user to be picked up, etc. In some embodiments, the fleet management system 1402 may instruct one single AV 102 to perform multiple ridehail/rideshare services. For example, the fleet management system 1402 instructs the AV 102 to pick up riders and/or items from one location and deliver the riders and/or items to multiple locations, or vice versa. The fleet management system 1402 also manages maintenance tasks, such as charging and servicing of the AVs 102. As shown in FIG. 14, each of the AVs 102 communicates with the fleet management system 1402. The AVs 102 and fleet management system 1402 may connect over a public network, such as the Internet. The fleet management system 1402 is described further in relation to FIG. 15.

In some embodiments, the fleet management system 1402 may also provide the AV 102 (and particularly, Onboard controller 106) with system backend functions. The fleet management system 1402 may include one or more switches, servers, databases, live advisors, or an automated voice response system (VRS). The fleet management system 1402 may include any or all of the aforementioned components, which may be coupled to one another via a wired or wireless local area network (LAN). The fleet management system 1402 may receive and transmit data via one or more appropriate devices and network from and to the AV 102, such as by wireless systems, such as 882.11x, general packet radio service (GPRS), and the like. A database at the fleet management system 1402 can store account information such as subscriber authentication information, vehicle identifiers, profile records, behavioral patterns, and other pertinent subscriber information. The fleet management system 1402 may also include a database of roads, routes, locations, etc. permitted for use by AV 102. The fleet management system 1402 may communicate with the AV 102 to provide route guidance in response to a request received from the vehicle.

For example, based upon information stored in a mapping system of the fleet management system 1402, the fleet management system 1402 may determine the conditions of various roads or portions thereof. Autonomous vehicles, such as the AV 102, may, in the course of determining a navigation route, receive instructions from the fleet management system 1402 regarding which roads or portions thereof, if any, are appropriate for use under certain circumstances, as described herein. Such instructions may be based in part on information received from the AV 102 or other autonomous vehicles regarding road conditions. Accordingly, the fleet management system 1402 may receive information regarding the roads/routes generally in real-time from one or more vehicles.

The fleet management system 1402 communicates with the client device 1404. For example, the fleet management system 1402 receives ridehail/rideshare requests from the client device 1404. The ridehail/rideshare request may include information of the user to be picked up, information of one or more items to be picked up, information of the location for the pick up (e.g., store location, distribution center location, warehouse location, location of a customer, etc.), and so on. The fleet management system 1402 can provide information associated with the ridehail/rideshare request (e.g., information related to the identity of the user to be picked up, information of the status of the ridehail/rideshare process, etc.) to the client device 1404.

The client device 1404 may be a device (e.g., a computer system) of a user of the fleet management system 1402. The user may be an entity or an individual. In some embodiments, a user may be a customer of another user. In an embodiment, the client device 1404 is an online system maintained by a business (e.g., a retail business, a ridehail/rideshare business, a package service business, etc.). The client device 1404 may be an application provider communicating information describing applications for execution by the user device 1406 or communicating data to the user device 1406 for use by an application executing on the user device 1406.

The user device 1406 is one or more computing devices capable of receiving user input as well as transmitting and/or receiving data via the network. The user device 1406 may be a device of an individual. The user device 1406 communicates with the client device 1404 to request use of the AV 102. For example, the user device 1406 may send a ridehail request or user pick up request to the client device 1404 through an application executed on the user device 1406. The user device 1406 may receive from the client device 1404 information associated with the request, such as the identity of the user to be picked up, a status of a ridehail/rideshare process, etc. In one embodiment, the user device 1406 is a conventional computer system, such as a desktop or a laptop computer. Alternatively, a user device 1406 may be a device having computer functionality, such as a personal digital assistant (PDA), a mobile telephone, a smartphone, or another suitable device. A user device 1406 is configured to communicate via the network. In one embodiment, a user device 1406 executes an application allowing a user of the user device 1406 to interact with the fleet management system 1402. For example, a user device 1406 executes a browser application to enable interaction between the user device 1406 and the fleet management system 1402 via the network. In another embodiment, a user device 1406 interacts with the fleet management system 1402 through an application programming interface (API) running on a native operating system of the user device 1406, such as IOS® or ANDROID™.

Example Online System

Figure 15:
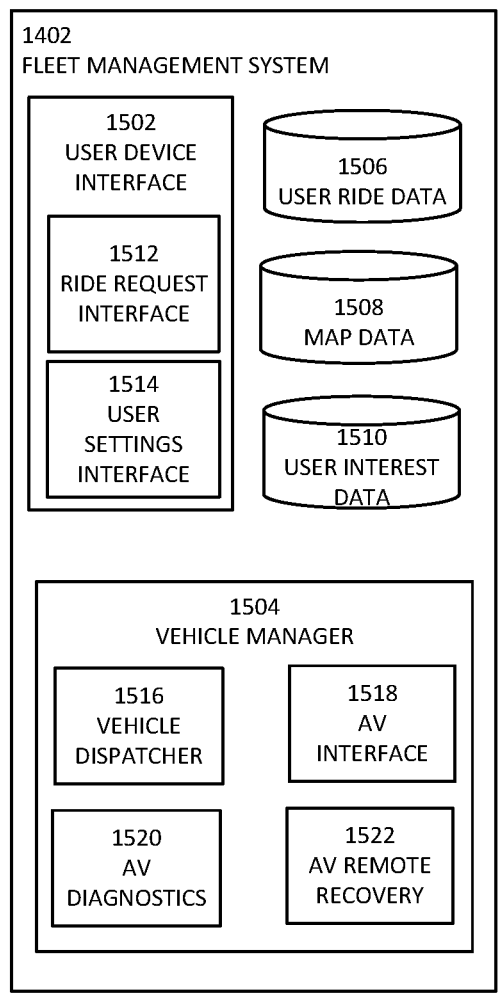
FIG. 15 is a block diagram illustrating a fleet management system according to some embodiments of the present disclosure.

FIG. 15 is a block diagram illustrating the fleet management system 1402 according to some embodiments of the present disclosure. The fleet management system 1402 can include a user device interface 1502, a vehicle manager 1504, user ride data 1506, map data 1508, and user interest data 1510. Each of the user ride data 1506, the map data 1508, and the user interest data 1510 can be located in one or more data stores. In some examples, the one or more datastores are one or more databases. The user device interface 1502 includes a ride request interface 1512 and user settings interface 1514. The vehicle manager 1504 includes a vehicle dispatcher 1516, an AV interface 2318, an AV diagnostics module 1520, and an AV remote recovery module 1522. Alternative configurations, different or additional components may be included in the fleet management system 1402. Further, functionality attributed to one component of the fleet management system 1402 may be accomplished by a different component included in the fleet management system 1402 or a different system (e.g., the onboard controller of an AV 102).

The user device interface 1502 is configured to communicate with third-party devices (e.g., the user device 1406) that provide a UI to users. For example, the user device interface 1502 may be a web server that provides a browser-based application to third-party devices, or the user device interface 1502 may be a mobile app server that interfaces with a mobile app installed on third-party devices. For example, the user device interface 1502 may provide one or more apps or browser-based interfaces that can be accessed by users, such as the users using user device 1406. The user device interface 1502 includes the ride request interface 1512, that enables the users to submit requests to a ride service provided or enabled by the fleet management system 1402. The user device interface 1502 further includes the user settings interface 1514 that the user can use to select ride settings. The user settings interface 1514 may enable the user to opt-in to some, all, or none of the options offered by the ride service provider. The user settings interface 1514 may further enable the user to opt-in to certain user device resource usage features (e.g., to opt-in to allow the AV to access the camera on the user device to obtain supplemental image data). The user settings interface 1514 may explain how this data is used and may enable users to selectively opt-in to certain user device resource usage features, or to opt-out of all of the user device resource usage features.

The user ride data 1506 stores ride information associated with users of the ride service. The user ride data 1506 may include an origin location and a destination location for a user's current ride. The map data 1508 stores a detailed map of environments through which the AVs 102 may travel. The map data 1508 includes data describing roadways, (e.g., locations of roadways, connections between roadways, roadway names, speed limits, traffic flow regulations, toll information, etc.). The user interest data 1510 stores data indicating user interests. For example, a learning module may compare locations in the user ride data 1506 with map data 1508 to identify places the user has visited or plans to visit.

The vehicle manager 1504 manages and communicates with a fleet of AVs (e.g., the AVs 102). The vehicle manager 1504 may assign AVs 102 to various tasks and direct the movements of the AVs 102 in the fleet. The vehicle manager 1504 includes the vehicle dispatcher 1516, the AV interface 1518, the AV diagnostics module 1520, and the AV remote recovery module 1522. The vehicle dispatcher 1516 selects AVs from the fleet to perform various tasks and instructs the AVs to perform the tasks. For example, the vehicle dispatcher 1516 receives a ride request from the ride request interface 1512. The vehicle dispatcher 1516 selects an AV 102 to service the ride request based on the information provided in the ride request, (e.g., the origin and destination locations).

The AV interface 1518 interfaces with the AVs 102, and in particular, with the onboard controller 106 of the AVs 102. The AV interface 1518 allows for bi-directional wireless communication between the fleet management system 1402 and AVs 102. The AV interface 1518 may receive sensor data from the AVs 102, such as camera images, captured sound, and other outputs from the sensor suite 108.

The AV diagnostics module 1520 can remotely perform a diagnostic analysis of the disabled AV 102*b*. In some examples, using the AV interface 1518, the fleet management system 1402 is in direct communication with the disabled AV 102*b* and can perform a diagnostic analysis of the disabled AV 102*b*. In other examples, the fleet management system 1402 is in communication with the disabled AV 102*b* through the towing AV 102*a* and receives results of a diagnostic analysis of the disabled AV 102*b* from the towing AV 102*a*. The AV remote recovery module 1522 can be used to facilitate a remote recovery of the disabled AV 102*b*. For example, _____.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of the embodiment, examples, and/or operations disclosed herein may be implemented using one or more electrical circuits on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurations (e.g., programmable) elements arranged in a structure that supports these functions. The software or firmware providing the emulation may be provided on non-transitory computer-readable storage medium comprising instructions to allow a processor to carry out those functionalities.

Additionally, one or more of the AV 102, the Onboard controller 106, the sensor suite 108, the fleet management system 1402, and the user device 1406 may include one or more processors that can execute software, logic, or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an application specific integrated circuit (ASIC) that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

Each of the AV 102, the Onboard controller 106, the sensor suite 108, the fleet management system 1402, and the user device 1406 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Each of the AV 102, the Onboard controller 106, the sensor suite 108, the fleet management system 1402, and the user device 1406 can include memory elements for storing information to be used in the operations outlined herein. The AV 102, the Onboard controller 106, the sensor suite 108, the fleet management system 1402, and the user device 1406 may keep information in any suitable memory element (e.g., random access memory (RAM), read-only memory (ROM), erasable programmable ROM (EPROM), electrically erasable programmable ROM (EEPROM), ASIC, etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in the AV 102, the Onboard controller 106, the sensor suite 108, the fleet management system 1402, and the user device 1406 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these examples, memory elements can store data used for the operations described herein. This includes the memory elements being able to store software, logic, code, or processor instructions that are executed to carry out the activities described herein.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

Other Notes and Examples

Example M1 is a method for assisting a disabled vehicle using a towing vehicle, the method including identifying a location of the disabled vehicle, deploying the towing vehicle to the location of the disabled vehicle, wherein the towing vehicle uses sensor data from a sensor suite and a perception module to navigate to the location of the disabled vehicle, and using the towing vehicle to tow the disabled vehicle to a new location.

In Example M2, the subject matter of Example M1 can optionally include where a two-way communication channel is established between the disabled vehicle and the towing vehicle.

In Example M3, the subject matter of Example M1 can optionally include where diagnostic analysis is performed on the disabled vehicle by the towing vehicle.

In Example M4, the subject matter of Example M1 can optionally include where the disabled vehicle is disabled due to a compute issue.

In Example M5, the subject matter of Example M4 can optionally include where the compute issue is related to a communication module and the compute issue is preventing the disabled vehicle from communicating with a fleet management system.

In Example, M6, the subject matter of Example M5 can optionally include where a communication module on the towing vehicle is used as a bridge between the disabled vehicle and the fleet management system to allow the disabled vehicle to communicate with the fleet management system.

In Example, M7, the subject matter of Example M4 can optionally include where one or more modules are reset to try and resolve the compute issue.

In Example, M8, the subject matter of Example M1 can optionally include where the compute issue is related to collecting and/or processing of sensor data.

In Example, M9, the subject matter of Example M8 can optionally where the towing vehicle shares sensor data with the disabled vehicle.

In Example, M10, the subject matter of Example M1 can optionally include where the disabled vehicle is disabled due to a mechanical issue.

In Example, M11, the subject matter of Example M10 can optionally include where the mechanical issue is a flat tire and the towing vehicle temporarily fixes the flat tire to allow the disabled vehicle to be towed to the new location.

In Example, M12, the subject matter of Example M1 can optionally include where the towing vehicle takes control of the disabled vehicle to tow the disabled vehicle to the new location.

In Example, M13, the subject matter of Example M1 can optionally include where the towing vehicle provides a guidance signal for the disabled vehicle to follow to tow the disabled vehicle to the new location.

In Example, M14, the subject matter of Example M1 can optionally include where the guidance signal is a laser, beam of light, or beacon.

In Example, M15, the subject matter of Example M1 can optionally include where the towing vehicle physically tows the disabled vehicle to the new location.

In Example, M16, the subject matter of Example M1 can optionally include where the disabled vehicle is stopped on a street or road and is blocking traffic and the disabled vehicle is towed to the new location where the disabled vehicle is no longer blocking traffic on the street or road.

In Example, M17, the subject matter of Example M1 can optionally include where the disabled vehicle is an autonomous vehicle.

In Example M18, the subject matter of any of Examples M1-M2 can optionally include where diagnostic analysis is performed on the disabled vehicle by the towing vehicle.

In Example M19, the subject matter of any of Examples M1-M3 can optionally include where the disabled vehicle is disabled due to a compute issue.

In Example M20, the subject matter of any of Examples M1-M4 can optionally include where the compute issue is related to a communication module and the compute issue is preventing the disabled vehicle from communicating with a fleet management system.

In Example, M21, the subject matter of any of Examples M1-M5 can optionally include where a communication module on the towing vehicle is used as a bridge between the disabled vehicle and the fleet management system to allow the disabled vehicle to communicate with the fleet management system.

In Example, M22, the subject matter of any of Examples M1-M6 can optionally include where one or more modules are reset to try and resolve the compute issue.

In Example, M23, the subject matter of any of Examples M1-M7 can optionally include where the compute issue is related to collecting and/or processing of sensor data.

In Example, M24, the subject matter of any of Examples M1-M8 can optionally where the towing vehicle shares sensor data with the disabled vehicle.

In Example, M25, the subject matter of any of the Examples M1-M9 can optionally include where the disabled vehicle is disabled due to a mechanical issue.

In Example, M26, the subject matter of any of the Examples M1-M10 can optionally include where the mechanical issue is a flat tire and the towing vehicle temporarily fixes the flat tire to allow the disabled vehicle to be towed to the new location.

In Example, M27, the subject matter of any of the Examples M1-M11 can optionally include where the towing vehicle takes control of the disabled vehicle to tow the disabled vehicle to the new location.

In Example, M28, the subject matter of any of the Examples M1-M12 can optionally include where the towing vehicle provides a guidance signal for the disabled vehicle to follow to tow the disabled vehicle to the new location.

In Example, M29, the subject matter of any of the Examples M1-M13 can optionally include where the guidance signal is a laser, beam of light, or beacon.

In Example, M30, the subject matter of any of the Examples M1-M14 can optionally include where the towing vehicle physically tows the disabled vehicle to the new location.

In Example, M31, the subject matter of any of the Examples M1-M15 can optionally include where the disabled vehicle is stopped on a street or road and is blocking traffic and the disabled vehicle is towed to the new location where the disabled vehicle is no longer blocking traffic on the street or road.

In Example, M32, the subject matter of any of the Examples M1-M16 can optionally include where the disabled vehicle is an autonomous vehicle.

Example MM1 is a method for deploying a towing vehicle to a disabled vehicle by a fleet management system, the method including determining that a vehicle has become disabled, determining a current location of the disabled vehicle, and deploying the towing vehicle to the current location of the disabled vehicle, wherein the towing vehicle uses sensor data from a sensor suite and a localization module to determine a current location of the towing vehicle and, after the towing vehicle reaches the current location of the disabled vehicle, the towing vehicle tows the disabled vehicle away from the current location of the disabled vehicle.

In Example MM2, the subject matter of Example MM1 can optionally include where the determination that the vehicle has become disabled is based at least in part on a communication message from the disabled vehicle.

In Example MM3, the subject matter of Example MM1 can optionally include where the determination that the vehicle has become disabled is based at least in part on a lack of communication with the disabled vehicle for a predetermined period of time.

In Example MM4, the subject matter of Example MM1 can optionally include where the disabled vehicle is disabled due to a compute issue and the compute issue is preventing the disabled vehicle from communicating with the fleet management system.

In Example MM5, the subject matter of any of Example MM4 can optionally include where a communication module on the towing vehicle is used to establish a two-way communication channel between the disabled vehicle and the towing vehicle.

In Example, MM6, the subject matter of Example MM1 can optionally include where the communication module on the towing vehicle is used as a bridge between the disabled vehicle and the fleet management system to allow the disabled vehicle to communicate with the fleet management system.

In Example, MM7, the subject matter of Example MM1 can optionally include where diagnostic analysis is performed on the disabled vehicle by the towing vehicle.

In Example, MM8, the subject matter of Example MM1 can optionally include where results of the diagnostic analysis of the disabled vehicle are sent to the fleet management system.

In Example, MM9, the subject matter of Example MM1 can optionally include where the disabled vehicle is an autonomous vehicle.

In Example, MM10, the subject matter of Example MM1 can optionally include where the disabled vehicle and the towing vehicle are part of a fleet of autonomous vehicles controlled by the fleet management system.

In Example, MM11, the subject matter of Example MM1 can optionally include where the disabled vehicle is a ridehail/ride share service vehicle.

In Example MM12, the subject matter of any of the Examples MM1-MM2 can optionally include where the determination that the vehicle has become disabled is based at least in part on a lack of communication with the disabled vehicle for a predetermined period of time.

In Example MM13, the subject matter of any of the Examples MM1-MM3 can optionally include where the disabled vehicle is disabled due to a compute issue and the compute issue is preventing the disabled vehicle from communicating with the fleet management system.

In Example MM14, the subject matter of any of the Examples MM1-MM4 can optionally include where a communication module on the towing vehicle is used to establish a two-way communication channel between the disabled vehicle and the towing vehicle.

In Example, MM15, the subject matter of any of the Examples MM1-MM5 can optionally include where the communication module on the towing vehicle is used as a bridge between the disabled vehicle and the fleet management system to allow the disabled vehicle to communicate with the fleet management system.

In Example, MM16, the subject matter of any of the Examples MM1-MM6 can optionally include where diagnostic analysis is performed on the disabled vehicle by the towing vehicle.

In Example, MM17, the subject matter of any of the Examples MM1-MM7 can optionally include where results of the diagnostic analysis of the disabled vehicle are sent to the fleet management system.

In Example, MM18, the subject matter of any of the Examples MM1-MM8 can optionally include where the disabled vehicle is an autonomous vehicle.

In Example, MM19, the subject matter of any of the Examples MM1-MM9 can optionally include where the disabled vehicle and the towing vehicle are part of a fleet of autonomous vehicles controlled by the fleet management system.

In Example, MM20, the subject matter of any of the Examples MM1-MM10 can optionally include where the disabled vehicle is a ridehail/ride share service vehicle.

Example A1, is a v towing vehicle including a communication module, a navigation module to control a motion of the towing vehicle and cause the towing vehicle to travel to a location of a disabled vehicle, and a disabled vehicle diagnostic module, to perform diagnostic testing on the disabled vehicle.

In Example A2, the subject matter of Example A1 can optionally include where the towing vehicle navigates to a last known location of the disabled vehicle.

In Example A3, the subject matter of Example A2 can optionally include where the towing vehicle uses the communication module to establish a two-way communication channel with the disabled vehicle and perform the diagnostic testing on the disabled vehicle.

In Example A4, the subject matter of Example A3 can optionally include a disabled vehicle repair module, wherein based on results of the diagnostic testing, the disabled vehicle repair module repairs the disabled vehicle to allow the towing vehicle to tow the disabled vehicle.

In Example A5, the subject matter of Example A1 can optionally include where results of the diagnostic testing indicate a compute issue with the disabled vehicle.

In Example A6, the subject matter of Example A5 can optionally include a disabled vehicle repair module, wherein the disabled vehicle repair module causes one or more systems on the disabled vehicle to reset in an attempt to resolve the compute issue.

In Example A7, the subject matter of Example A5 can optionally include where the compute issue is related to a communication module and the compute issue is preventing the disabled vehicle from communicating with a fleet management system.

In Example A8, the subject matter of Example A1 can optionally include where the towing vehicle uses the communication module as a bridge between the disabled vehicle and the fleet management system to allow the disabled vehicle to communicate with the fleet management system.

In Example A9, the subject matter of Example A1 can optionally include where the compute issue is related to collecting and/or processing of sensor data.

In Example A10, the subject matter of Example A1 can optionally include a sensor suite that includes a plurality of sensors and the towing vehicle shares sensor data from the sensor suite with the disabled vehicle.

In Example A11, the subject matter of Example A1 can optionally include a disabled vehicle controller, wherein the compute issue cannot be resolved and the disabled vehicle controller is used to take over system functions of the disabled vehicle to move the disabled vehicle.

In Example A12, the subject matter of Example A1 can optionally include where the towing vehicle uses one or more visual sensors to visually inspect the disabled vehicle.

In Example A13, the subject matter of Example A1 can optionally include where the visual inspection of the disabled vehicle indicates the disabled vehicle has a flat tire and the towing vehicle temporarily fixes the flat tire to allow the disabled vehicle to travel to a new location.

In Example A14, the subject matter of Example A1 can optionally include a physical towing mechanism to physically attached to the disabled vehicle and tow the disabled vehicle.

In Example A15, the subject matter of Example A14 can optionally include where the physical towing mechanism attaches to the disabled vehicle without human intervention using magnets or an automatic mechanical retention mechanism.

In Example A16, the subject matter of any of Examples A1-A2 can optionally include where the towing vehicle uses the communication module to establish a two-way communication channel with the disabled vehicle and perform the diagnostic testing on the disabled vehicle.

In Example A17, the subject matter of any of Examples A1-A3 can optionally include a disabled vehicle repair module, wherein based on results of the diagnostic testing, the disabled vehicle repair module repairs the disabled vehicle to allow the towing vehicle to tow the disabled vehicle.

In Example A18, the subject matter of any of Examples A1-A4 can optionally include where results of the diagnostic testing indicate a compute issue with the disabled vehicle.

In Example A19, the subject matter of any of Examples A1-A5 can optionally include a disabled vehicle repair module, wherein the disabled vehicle repair module causes one or more systems on the disabled vehicle to reset in an attempt to resolve the compute issue.

In Example A20, the subject matter of any of Examples A1-A6 can optionally include where the compute issue is related to a communication module and the compute issue is preventing the disabled vehicle from communicating with a fleet management system.

In Example A21, the subject matter of any of Examples A1-A7 can optionally include where the towing vehicle uses the communication module as a bridge between the disabled vehicle and the fleet management system to allow the disabled vehicle to communicate with the fleet management system.

In Example A22, the subject matter of any of Examples A1-A8 can optionally include where the compute issue is related to collecting and/or processing of sensor data.

In Example A23, the subject matter of any of Examples A1-A9 can optionally include a sensor suite that includes a plurality of sensors and the towing vehicle shares sensor data from the sensor suite with the disabled vehicle.

In Example A24, the subject matter of any of Examples A1-A10 can optionally include a disabled vehicle controller, wherein the compute issue cannot be resolved and the disabled vehicle controller is used to take over system functions of the disabled vehicle to move the disabled vehicle.

In Example A25, the subject matter of any of Examples A1-A11 can optionally include where the towing vehicle uses one or more visual sensors to visually inspect the disabled vehicle.

In Example A26, the subject matter of any of Examples A1-A12 can optionally include where the visual inspection of the disabled vehicle indicates the disabled vehicle has a flat tire and the towing vehicle temporarily fixes the flat tire to allow the disabled vehicle to travel to a new location.

In Example A27, the subject matter of any of Examples A1-A13 can optionally include a physical towing mechanism to physically attached to the disabled vehicle and tow the disabled vehicle.

In Example A28, the subject matter of any of Examples A1-A14 can optionally include where the physical towing mechanism attaches to the disabled vehicle without human intervention using magnets or an automatic mechanical retention mechanism.

Example AA1 is a device including at least one machine-readable medium located in a towing vehicle comprising one or more instructions that, when executed by at least one processor, causes the at least one processor to receive a location of a disabled vehicle, navigate the towing vehicle to the location of the disabled vehicle, establish a two-way communication channel between the towing vehicle and the disabled vehicle, perform a diagnostic analysis on the disabled vehicle, and tow the disabled vehicle to a new location.

In Example AA2, the subject matter of Example AA1 can optionally include where the location of a disabled vehicle is received from a fleet management system and the disabled vehicle and the towing vehicle are part of a fleet of autonomous vehicles controlled by the fleet management system.

What is claimed is:

1. A method for assisting a disabled vehicle using a towing vehicle, the method comprising:
   identifying a location of the disabled vehicle;
   causing the towing vehicle to drive to the location of the disabled vehicle, wherein the towing vehicle uses sensor data from a sensor suite and a perception module to navigate to the location of the disabled vehicle;
   establishing at least a one-way communication connection from the towing vehicle to the disabled vehicle;
   performing diagnostic testing on the disabled vehicle;
   determining that the disabled vehicle is disabled due to a compute issue;
   determining whether a sensor interface module of the disabled vehicle is disabled and whether the towing vehicle is able to supplement sensor data of the disabled vehicle;
   in response to determining that the sensor interface module of the disabled vehicle is disabled and that the towing vehicle is unable to supplement sensor data of the disabled vehicle, resetting a sensor interface module of the disabled vehicle;
   in response to determining that the sensor interface module of the disabled vehicle is not disabled, determining whether the disabled vehicle is disabled due to a state issue;
   in response to determining that the disabled vehicle is disabled due to the state issue, resetting a stack of the disabled vehicle and determining whether resetting the stack resolved the state issue;
   in response to determining that resetting the stack resolved the state issue, virtually towing the disabled vehicle to a new location;
   in response to determining that resetting the stack did not resolve the state issue, determining whether the disabled vehicle can be moved; and
   in response to determining that the disabled vehicle cannot be moved, guarding the disabled vehicle using flashing lights to warn oncoming vehicles about the disabled vehicle.

2. The method of claim 1, further comprising:
   establishing a two-way communication channel between the towing vehicle and the disabled vehicle.

3. The method of claim 2, further comprising:
   in response to determining that the sensor interface module of the disabled vehicle is disabled and that the towing vehicle is able to supplement sensor data of the disabled vehicle, supplementing, by the towing vehicle, sensor data of the disabled vehicle to tow the disabled vehicle to a safe location.

4. The method of claim 1, wherein the diagnostic testing is performed on the disabled vehicle by the towing vehicle.

5. The method of claim 1, further comprising:
   in response to determining that resetting the stack resolved the state issue, determining whether the towing vehicle can take control of the disabled vehicle.

6. The method of claim 1, further comprising:
   in response to determining that the disabled vehicle is not disabled due to the state issue, determining whether the towing vehicle can take control of the disabled vehicle.

7. The method of claim 1, further comprising:
   in response to determining that the disabled vehicle can be moved, physically towing the disabled vehicle using a physical towing mechanism involving a magnet that magnetically attaches to the disabled vehicle with enough force to physically tow the disabled vehicle.

8. A towing vehicle comprising:
   a communication module;
   a navigation module to control a motion of the towing vehicle and cause the towing vehicle to travel to a location of a disabled vehicle; and
   a disabled vehicle diagnostic module, to:
     perform diagnostic testing on the disabled vehicle; and
     determine that the disabled vehicle is disabled due to a compute issue;
   a disabled vehicle repair module to, based on results of the diagnostic testing:

determine whether a sensor interface module of the disabled vehicle is disabled and whether the towing vehicle is able to supplement sensor data of the disabled vehicle;

in response to determining that the sensor interface module of the disabled vehicle is disabled and that the towing vehicle is unable to supplement sensor data of the disabled vehicle, reset a sensor interface module of the disabled vehicle;

in response to determining that the sensor interface module of the disabled vehicle is not disabled, determine whether the disabled vehicle is disabled due to a state issue; and in response to determining that the disabled vehicle is disabled due to the state issue, reset a stack of the disabled vehicle and determine whether resetting the stack resolved the state issue; and a disabled vehicle controller, to:
in response to determining that resetting the stack resolved the state issue, take over system functions of the disabled vehicle and move the disabled vehicle;

wherein the navigation module is further to, in response to determining that resetting the stack did not resolve the state issue, control the towing vehicle to guard the disabled vehicle and to use hazard lights to warn oncoming vehicles about the disabled vehicle.

9. The towing vehicle of claim 8, wherein the towing vehicle uses the communication module to establish a two-way communication channel with the disabled vehicle and perform the diagnostic testing on the disabled vehicle.

10. The towing vehicle of claim 8, further comprising:
a disabled vehicle repair module, wherein based on results of the diagnostic testing, the disabled vehicle repair module repairs the disabled vehicle to allow the towing vehicle to tow the disabled vehicle.

11. The towing vehicle of claim 8, wherein the disabled vehicle diagnostic module is further to, in response to determining that resetting the stack did not resolve the state issue, request assistance from a fleet management system.

12. The towing vehicle of claim 11, wherein the compute issue is related to a communication module located in the disabled vehicle that is preventing the disabled vehicle from communicating with a fleet management system, wherein the towing vehicle uses the communication module in the towing vehicle as a bridge between the disabled vehicle and the fleet management system to allow the disabled vehicle to communicate with the fleet management system.

13. The towing vehicle of claim 11, further comprising:
a sensor suite that includes a plurality of sensors, wherein the compute issue is related to collecting and/or processing of sensor data and the towing vehicle shares sensor data from the sensor suite of the towing vehicle with the disabled vehicle.

14. The towing vehicle of claim 8, wherein
the disabled vehicle diagnostic module is further to, in response to determining that resetting the stack did not resolve the state issue, determine whether the towing vehicle can take control of the disabled vehicle.

15. The towing vehicle of claim 8,
wherein the disabled vehicle diagnostic module is further to, in response to determining that resetting the stack did not resolve the state issue, determine whether the disabled vehicle can be moved.

16. The towing vehicle of claim 8, wherein the towing vehicle uses one or more visual sensors to visually inspect the disabled vehicle.

17. The towing vehicle of claim 16, wherein a visual inspection of the disabled vehicle performed by the towing vehicle using the one or more visual sensors indicates the disabled vehicle has a flat tire and the towing vehicle activates a tire inflation mechanism to inject an expanding foam into the flat tire to temporarily fix the flat tire and allow the disabled vehicle to travel to a new location.

18. The towing vehicle of claim 8, further comprising:
a physical towing mechanism to physically attached to the disabled vehicle and tow the disabled vehicle, wherein the physical towing mechanism attaches the towing vehicle to the disabled vehicle without human intervention using magnets.

19. At least one non-transitory machine-readable medium located in a towing vehicle, the at least one machine-readable medium comprising one or more instructions that, when executed by at least one processor, causes the at least one processor to:
receive a location of a disabled vehicle;
navigate the towing vehicle to the location of the disabled vehicle;
establish a two-way communication channel between the towing vehicle and the disabled vehicle;
perform a diagnostic analysis on the disabled vehicle;
determine that the disabled vehicle is disabled due to a compute issue;
determine whether a sensor interface module of the disabled vehicle is disabled;
in response to determining that the sensor interface module of the disabled vehicle is disabled, reset a sensor interface module of the disabled vehicle;
in response to determining that the sensor interface module of the disabled vehicle is not disabled, determine whether the disabled vehicle is disabled due to a state issue;
in response to determining that the disabled vehicle is disabled due to the state issue, reset a stack of the disabled vehicle and determine whether resetting the stack resolved the state issue;
in response to determining that resetting the stack resolved the state issue, virtually and tow the disabled vehicle to a new location;
in response to determining that resetting the stack did not resolve the state issue, determining whether the disabled vehicle can be moved;
in response to determining that the disabled vehicle cannot be moved, request, by the towing vehicle, assistance from a fleet management system and act, by the towing vehicle, as a sentinel for the disabled vehicle to mitigate safety hazards; and
in response to determining that the disabled vehicle can be moved, physically move the disabled vehicle using a magnet to the new location.

20. The at least one non-transitory machine-readable medium of claim 19, wherein the location of a disabled vehicle is received from a fleet management system and the disabled vehicle and the towing vehicle are part of a fleet of autonomous vehicles controlled by the fleet management system.

* * * * *